US012719119B2

(12) United States Patent
Lee

(10) Patent No.: US 12,719,119 B2
(45) Date of Patent: Aug. 25, 2026

(54) SECONDARY BATTERY

(71) Applicant: LG Energy Solution, Ltd., Seoul (KR)

(72) Inventor: Hyun Hee Lee, Daejeon (KR)

(73) Assignee: LG Energy Solution, Ltd., Seoul (KR)

( * ) Notice: Subject to any disclaimer, the term of this patent is extended or adjusted under 35 U.S.C. 154(b) by 0 days.

(21) Appl. No.: 19/297,840

(22) Filed: Aug. 12, 2025

(65) Prior Publication Data

US 2026/0051585 A1 Feb. 19, 2026

(30) Foreign Application Priority Data

Aug. 19, 2024 (KR) ........................ 10-2024-0110751
Sep. 11, 2024 (KR) ........................ 10-2024-0123755
(Continued)

(51) Int. Cl.
*H01M 50/188* (2021.01)
*H01M 50/147* (2021.01)
(Continued)

(52) U.S. Cl.
CPC ....... *H01M 50/188* (2021.01); *H01M 50/147* (2021.01); *H01M 50/172* (2021.01);
(Continued)

(58) Field of Classification Search
CPC ............. H01M 50/188; H01M 50/147; H01M 50/172; H01M 50/528; H01M 50/531;
(Continued)

(56) References Cited

U.S. PATENT DOCUMENTS 10,381,631 B2 8/2019 Kagami et al.
2010/0304214 A1* 12/2010 Itoh .................... H01M 50/186 429/185
(Continued)

FOREIGN PATENT DOCUMENTS

CN 201868502 U 6/2011
CN 115513514 A 12/2022
(Continued)

OTHER PUBLICATIONS

Extended European Search Report including Written Opinion for Application No. 25195462.4 dated Jan. 22, 2026 . . . 10 pgs.

*Primary Examiner* — Daniel S Gatewood
(74) *Attorney, Agent, or Firm* — Lerner David LLP

(57) ABSTRACT

A secondary battery includes an electrode assembly, a case having the electrode assembly received therein, and a cap assembly coupled to the case and covering an opening of the case. The cap assembly includes a cap plate including a through hole, a rivet part including a body part and an inner fastening portion, a base insulating member disposed between the cap plate and the electrode assembly, and a gasket disposed between the cap plate and the rivet part. The body part of the rivet is positioned in the through hole and extends toward an outside of the case, and the inner fastening portion extends from the body part between the cap plate and the electrode assembly. A part of the base insulating member and a part of the gasket contact the inner fastening portion and extend parallel to each other between the cap plate and the inner fastening portion.

18 Claims, 27 Drawing Sheets

(30) Foreign Application Priority Data

Apr. 2, 2025 (KR) ........................ 10-2025-0043060
Apr. 2, 2025 (KR) ........................ 10-2025-0043061
Aug. 11, 2025 (KR) ........................ 10-2025-0110932
Aug. 11, 2025 (KR) ........................ 10-2025-0110951

(51) Int. Cl.
*H01M 50/172* (2021.01)
*H01M 50/528* (2021.01)
*H01M 50/531* (2021.01)
*H01M 50/567* (2021.01)
*H01M 50/586* (2021.01)
*H01M 50/588* (2021.01)

(52) U.S. Cl.
CPC ....... *H01M 50/528* (2021.01); *H01M 50/531* (2021.01); *H01M 50/567* (2021.01); *H01M 50/586* (2021.01); *H01M 50/588* (2021.01)

(58) Field of Classification Search
CPC . H01M 50/567; H01M 50/586; H01M 50/588
See application file for complete search history.

(56) References Cited

U.S. PATENT DOCUMENTS

2012/0058388 A1 3/2012 Kim et al.
2013/0004833 A1* 1/2013 Kim ...................... H01M 50/55 429/181
2013/0029190 A1 1/2013 Kim
2013/0260220 A1 10/2013 Ahn et al.
2014/0113163 A1* 4/2014 Nagata ................ H01M 50/578 429/61
2014/0363731 A1 12/2014 Tanaka et al.
2017/0098808 A1 4/2017 Guen
2017/0098816 A1 4/2017 Guen
2017/0104202 A1* 4/2017 Umeyama ........... H01M 50/578
2018/0287128 A1 10/2018 Takasu et al.
2023/0198064 A1 6/2023 Oshima et al.
2024/0195030 A1 6/2024 Li

FOREIGN PATENT DOCUMENTS

EP 4199206 A1 6/2023
JP 2018174057 A 11/2018
JP 2023092956 A 7/2023
KR 101222276 B1 1/2013
KR 20130013787 A 2/2013
KR 1020130111285 A 10/2013
KR 101566040 B1 11/2015
KR 101649137 B1 8/2016
KR 20170039893 A 4/2017
KR 20170039932 A 4/2017
KR 101867374 B1 6/2018
KR 20180075415 A 7/2018
KR 101941350 B1 1/2019
KR 102265367 B1 6/2021
KR 20220149700 A 11/2022
KR 20230046949 A 4/2023
KR 20240034637 A 3/2024
KR 20240117454 A 8/2024
WO 2008154499 A1 12/2008

* cited by examiner

SECONDARY BATTERY

CROSS-REFERENCE TO RELATED APPLICATIONS

This application claims priority from Korean Patent Application Nos. 10-2024-0110751 filed on Aug. 19, 2024, 10-2024-0123755 filed on Sep. 11, 2024, 10-2025-0043060, 10-2025-0043601 filed on Apr. 2, 2025, and 10-2025-0110932, 10-2025-0110951 filed on Aug. 11, 2025 the entire disclosures of which are incorporated herein by reference.

BACKGROUND

1. Technical Field

The present disclosure relates to a secondary battery, and more particularly, to a secondary battery in which a rivet part is inserted into a hole that penetrates a cap plate and an electrode terminal of a cap assembly.

2. Related Art

Recently, as the demand for portable electronic products has surged and the development of electric vehicles, storage batteries for energy storage, robots, and satellites is accelerated, a high-performance secondary battery capable of repeated charging and discharging is actively researched.

Secondary batteries may be classified into a can type secondary battery, in which an electrode assembly is embedded in a metal can, and a pouch type secondary battery, in which an electrode assembly is embedded in a pouch formed of an aluminum laminate sheet, depending on a shape of the battery case. The can type secondary batteries may be classified into a cylindrical secondary battery and a prismatic secondary battery, depending on a shape of the metal can.

In the can type secondary battery, the electrode assembly is accommodated in a case made of a metal material, and the cap assembly is combined with the opening of the case. In this case, if sealing between components forming the cap assembly is weakened, a problem, such as the leakage of an electrolyte, may occur. In particular, sealing between a cap plate and an electrode terminal combined therewith along the through hole of the cap plate is important. If the sealing of the cap assembly is increased in order to solve such a problem, strengthening the sealing of the cap assembly may lead to the use of various sealing components, which complicates the assembly process.

Accordingly, there is a need to develop a cap assembly of a secondary battery that can be assembled simply while preventing the leakage of an electrolyte.

SUMMARY

Various aspects are directed to providing a secondary battery including a cap assembly which can prevent the leakage of an electrolyte and can be simply assembled.

Various aspects may be directed to enhancing sealing performance in an area near a rivet part.

Various aspects may be directed to reducing the thickness of an area near the rivet part.

Various aspects may be directed to increasing an adhesion force with a gasket part and other parts.

In an aspect, a secondary battery may include a case, an electrode assembly, a current collection member, and a cap assembly. An opening may be formed in the case. The electrode assembly may include an electrode part accommodated in the case and a plurality of electrode tabs formed at one end of the electrode part. The current collection member may include a current collection plate electrically connected to the electrode tabs and a current collection protrusion that protrudes from the current collection plate. The cap assembly may be combined with the opening of the case. The cap assembly may include a cap plate, an electrode terminal, a base insulating member, and a rivet part. A through hole may be formed in the cap plate. An insertion hole may be formed in the electrode terminal. The electrode terminal may be seated so that the through hole and the insertion hole align with each other over the cap plate. The base insulating member may be disposed between the cap plate and the electrode assembly. The rivet part may include a body part, an outer fastening portion, and an inner fastening portion. The body part may be a hollow structure into which the current collection protrusion is inserted, and may be inserted into the through hole and the insertion hole. The outer fastening portion may be bent toward the electrode terminal on one side of the body part. The inner fastening portion may be bent toward the base insulating member on the other side of the body part.

In the secondary battery according to an aspect of the present disclosure, the cap assembly may further include a terminal insulating member disposed between the electrode terminal and the cap plate.

In the secondary battery according to an aspect of the present disclosure, the cap assembly may further include a gasket disposed between the cap plate and the rivet part.

In the secondary battery according to an aspect of the present disclosure, the outer fastening portion and inner fastening portion of the rivet part may be pressurized in the direction of the cap plate.

In the secondary battery according to an aspect of the present disclosure, the inner fastening portion may be vertically thicker than the outer fastening portion.

In the secondary battery according to an aspect of the present disclosure, a maximum length of the inner fastening portion in a horizontal direction may be greater than a maximum length of the outer fastening portion in a horizontal direction.

In the secondary battery according to an aspect of the present disclosure, a seated groove in which the outer fastening portion of the rivet part is seated may be formed in the circumference of the insertion hole of the electrode terminal.

In the secondary battery according to an aspect of the present disclosure, the outer fastening portion of the rivet part may be seated so that the outer fastening portion of the rivet part has a lower height than the top of the electrode terminal.

In the secondary battery according to an aspect of the present disclosure, an accommodation groove may be formed in the circumference of the through hole on a top surface of the cap plate. An insulating protrusion part that protrudes in the direction of the cap plate may be formed in the terminal insulating member. The insulating protrusion part may be accommodated in the accommodation groove.

In the secondary battery according to an aspect of the present disclosure, a space isolated in a horizontal direction may be formed between the cap plate and the insulating protrusion part.

In the secondary battery according to an aspect of the present disclosure, a terminal groove may be formed on a top surface of the terminal insulating member. A terminal protrusion part that protrudes in the direction of the terminal insulating member may be formed in the electrode terminal. The terminal protrusion part may be accommodated in the terminal groove.

In the secondary battery according to an aspect of the present disclosure, the gasket may include a first sealing portion inserted into the through hole and a second sealing portion bent at one end of the first sealing portion and disposed under the cap plate.

In the secondary battery according to an aspect of the present disclosure, the insertion hole may have a smaller radius than the through hole. The top of the first sealing portion of the gasket may come into contact with a bottom of the electrode terminal.

In the secondary battery according to an aspect of the present disclosure, the second sealing portion of the gasket may have a thickness vertically identical with the thickness of the base insulating member.

In the secondary battery according to an aspect of the present disclosure, the inner fastening portion of the rivet part may extend up to the base insulating member after passing through the gasket.

In the secondary battery according to an aspect of the present disclosure, at least one rivet protrusion may be formed in the inner fastening portion of the rivet part in a direction toward the cap plate. A fastening groove into which the rivet protrusion is inserted may be formed in at least one of the base insulating member or the gasket.

In the secondary battery according to an aspect of the present disclosure, a groove may be formed in a portion of the gasket in which the first sealing portion and the second sealing portion come into contact with each other. A hole protrusion part inserted into the groove of the gasket may be formed at a bottom of the through hole of the cap plate.

In the secondary battery according to an aspect of the present disclosure, the second sealing portion of the gasket and the base insulating member may be disposed to be spaced apart from each other in a horizontal direction.

In the secondary battery according to an aspect of the present disclosure, the insertion hole may have a smaller radius than the through hole. The outer fastening portion of the rivet part may extend more outward than the through hole.

A secondary battery according to an aspect of the present disclosure may include an electrode assembly.

A secondary battery according to an aspect of the present disclosure may include a case configured to accommodate the electrode assembly and including an opening.

A secondary battery according to an aspect of the present disclosure may include a cap assembly combined with the case and configured to cover the opening.

A cap assembly according to an aspect of the present disclosure may include a cap plate including a through hole.

A cap assembly according to an aspect of the present disclosure may include a rivet part including a body part inserted into the through hole and configured to extend toward the outside of the case in a first direction and a fastening portion configured to extend from the body part in a second direction that intersects the first direction.

A cap assembly according to an aspect of the present disclosure may include a base insulating member disposed between the cap plate and the electrode assembly.

A cap assembly according to an aspect of the present disclosure may include a gasket disposed between the cap plate and the rivet part.

At least a part of the base insulating member and at least a part of the gasket according to an aspect of the present disclosure may be aligned in the second direction between the cap plate and the fastening portion, and may come into contact with the fastening portion in the first direction.

The at least a part of the base insulating member and the at least a part of the gasket according to an aspect of the present disclosure may be placed at the same height in the first direction within the cap assembly.

The at least a part of the base insulating member and the at least a part of the gasket according to an aspect of the present disclosure may have the same length in the first direction.

The fastening portion according to an aspect of the present disclosure may include a first pressurization portion configured to come into contact with the base insulating member.

The fastening portion according to an aspect of the present disclosure may include a second pressurization portion configured to come into contact with the gasket.

The base insulating member and the gasket according to an aspect of the present disclosure may be spaced apart from each other in the second direction.

A cap assembly according to an aspect of the present disclosure may include a space formed between the base insulating member and the gasket.

The gasket according to an aspect of the present disclosure may include a first sealing portion disposed between the body part and the cap plate.

The gasket according to an aspect of the present disclosure may include a the second sealing portion configured to extend from the first sealing portion in the second direction and aligned with the base insulating member in the second direction.

A secondary battery according to an aspect of the present disclosure may include an electrode terminal spaced apart from the cap plate in the first direction.

The fastening portion according to an aspect of the present disclosure may include an outer fastening portion bent from the body part and connected to the electrode terminal.

The fastening portion according to an aspect of the present disclosure may include an inner fastening portion bent from the body part between the gasket and the electrode assembly and configured to come into contact with the gasket.

A secondary battery according to an aspect of the present disclosure may include a current collection protrusion inserted into a hollow formed in the body part and a current collection member including a current collection plate configured to extend from the current collection protrusion in the second direction.

The fastening portion according to an aspect of the present disclosure may be disposed between the gasket and the current collection plate.

The rivet part according to an aspect of the present disclosure may include a rivet protrusion configured to protrude toward the gasket.

The gasket according to an aspect of the present disclosure may include a fastening groove in which the rivet protrusion is accommodated.

The cap plate according to an aspect of the present disclosure may include a hole protrusion part configured to protrude toward the gasket.

The gasket according to an aspect of the present disclosure may include a groove in which the hole protrusion part is accommodated.

A secondary battery according to an aspect of the present disclosure may include an electrode assembly including an electrode tab.

A secondary battery according to an aspect of the present disclosure may include a current collection member configured to connect the electrode tab and the cap assembly.

A cap assembly according to an aspect of the present disclosure may include a rivet part including a body part inserted into the through hole and configured to extend toward the outside of the case in a first direction and a hollow formed in the body part.

A cap assembly according to an aspect of the present disclosure may include a gasket including a first sealing portion disposed between the rivet part and the cap plate and a second sealing portion disposed between the current collection member and the cap plate.

The current collection member according to an aspect of the present disclosure may include a current collection protrusion inserted into the hollow in the first direction.

The current collection member according to an aspect of the present disclosure may include a current collection plate extended from the current collection protrusion and configured to overlap the second sealing portion in the first direction and to pressurize the second sealing portion toward the cap plate.

The rivet part according to an aspect of the present disclosure may include a fastening portion disposed between the current collection plate and the second sealing portion and configured to come into contact with the second sealing portion.

The current collection plate according to an aspect of the present disclosure may include a first current collection portion configured to overlap the second sealing portion and the fastening portion in the first direction.

The current collection plate according to an aspect of the present disclosure may include a second current collection portion extended from the first current collection portion in the second direction and configured to not overlap the second sealing portion in the first direction.

The first sealing portion according to an aspect of the present disclosure may be disposed between the cap plate and the current collection protrusion.

The current collection protrusion according to an aspect of the present disclosure may be configured to pressurize the first sealing portion toward the cap plate.

A secondary battery according to an aspect of the present disclosure may include a base insulating member disposed between the current collection plate and the cap plate.

The current collection plate according to an aspect of the present disclosure may be configured to pressurize the base insulating member toward the cap plate.

A cap assembly according to an aspect of the present disclosure may include a cap plate including a plate body and a plate recess depressed and formed in the plate body.

A cap assembly according to an aspect of the present disclosure may include a terminal insulating member including an insulating body stacked along with the cap plate in a first direction, an insulating member recess depressed and formed in the insulating body, and an insulating protrusion part seated in the plate recess.

A cap assembly according to an aspect of the present disclosure may include an electrode terminal including a terminal edge stacked along with the terminal insulating member in the first direction and a terminal protrusion part seated in the insulating member recess.

A cap plate according to an aspect of the present disclosure may include a plate step portion formed in the first direction.

The terminal insulating member according to an aspect of the present disclosure may include an insulating step portion formed in the first direction and configured to face the plate step portion in a second direction that intersects the first direction.

The plate step portion and the insulating step portion according to an aspect of the present disclosure may be spaced apart from each other in the second direction.

The cap assembly according to an aspect of the present disclosure may include a space formed between the plate step portion and the insulating step portion.

The electrode terminal according to an aspect of the present disclosure may include a terminal step portion formed in the first direction with respect to the insulating member recess and configured to connect the terminal protrusion part and the terminal edge.

The cap plate, the terminal insulating member, and the electrode terminal according to an aspect of the present disclosure may be stacked in the first direction with respective step shapes in the first direction.

According to a first aspect of the disclosure, a secondary battery may include a case and a cap assembly. The case may have an electrode assembly received in an inside of the case. The electrode assembly may be electrically connected to a current collection protrusion. The cap assembly may cover an opening of the case so as to enclose the electrode assembly within the case. The cap assembly may include a cap plate defining a through hole. The cap assembly may include an electrode terminal defining an insertion hole. The electrode terminal may be positioned such that the insertion hole is aligned with the through hole. The cap assembly may include a rivet. The rivet may include a hollow body arranged so that the current collection protrusion extends therethrough from the inside to an outside of the case. The body may be received through the through hole and the insertion hole. The rivet may further include a first bent part on an outside side of the body and bent toward the electrode terminal. The rivet may further include a second bent part on an inside side of the body opposite the outside side. The second bent part may be bent toward the cap plate. The first bent part and the second bent part may be monolithically formed with the body and may be bent toward each other so as to apply a securing force that presses the electrode terminal and the cap plate towards each other.

Further in the first aspect of the disclosure, the cap assembly may further include a terminal insulating member disposed between the electrode terminal and the cap plate. The cap plate may define an accommodation groove on a surface thereof. The terminal insulating member may include an insulating protrusion that protrudes toward the cap plate. The insulating protrusion may be received in the accommodation groove. The terminal insulating member may define a terminal groove on a surface thereof. The electrode terminal may include a terminal protrusion that protrudes toward the terminal insulating member. The terminal protrusion may be received in the terminal groove.

Further in the first aspect of the disclosure, the cap assembly may further include a gasket disposed between the cap plate and the rivet. The gasket may include an insertion part received within the through hole. The gasket may include a support part extending from the insertion part and disposed along an inside side of the cap plate. The insertion hole may have a smaller radius than the through hole. The insertion part of the gasket may contact the electrode terminal. A base insulating member may extend along the inside side of the cap plate, and the support part of the gasket may extend radially from the insertion part along the inside side of the cap plate to an outer edge radially spaced apart from the base insulating member. The gasket may define a groove at a location in which the insertion part and the support part contact each other. The cap plate may include a hole protrusion received in the groove of the gasket. The rivet may include at least one rivet protrusion extending from the second bent part toward the cap plate. At least one of the base insulating member or the gasket may define a fastening groove configured to receive the at least one rivet protrusion.

Further in the first aspect of the disclosure, the secondary battery may further include a base insulating member positioned between the cap plate and the electrode assembly. The first bent part may have a first thickness and the second bent part may have a second thickness greater than the first thickness. A maximum length of the second bent part in a radial direction may be greater than a maximum length of the first bent part in the radial direction. The electrode terminal may define a seated groove configured to receive the first bent part of the rivet. The seated groove may be defined within a circumference of the insertion hole of the electrode terminal. The first bent part of the rivet may be seated such that the electrode terminal extends beyond the first bent part of the rivet along an axial direction of the rivet.

Further in the first aspect of the disclosure, the secondary battery may further include a current collection member including a current collection plate electrically connected to the current collection protrusion. The electrode assembly may include a plurality of electrode tabs extending from a first end of an electrode portion.

According to a second aspect of the disclosure, a secondary battery may include a case and a cap assembly. The case may have an electrode assembly received in an inside of the case. The electrode assembly may be electrically connected to a current collection protrusion. The cap assembly may cover an opening of the case so as to enclose the electrode assembly within the case. The cap assembly may include a cap plate defining a through hole. The cap assembly may include an electrode terminal defining an insertion hole. The electrode terminal may be positioned such that the insertion hole is aligned with the through hole. The cap assembly may include a flanged member. The flanged member may include a body arranged so that the current collection protrusion extends therethrough from the inside to an outside of the case. The body may be received through the through hole and the insertion hole. The flanged member may include a first bent part on an outside side of the body and may be bent toward the electrode terminal. The flanged member may include a second bent part on an inside side of the body opposite the outside side. The second bent part may be bent toward the cap plate. The first bent part and the second bent part may be monolithically formed with the body and may be bent toward each other so as to apply a securing force that presses the electrode terminal and the cap plate towards each other.

Further in the second aspect of the disclosure, the cap plate and the electrode terminal may be secured together by the first and second bent parts of the flanged member.

According to a third aspect of the disclosure, a method of manufacturing a secondary battery may include assembling a cap by positioning an electrode terminal along an outer surface of a cap plate such that a through hole of the cap plate aligns with an insertion hole of the electrode terminal; inserting a flanged member through the through hole and the insertion hole, the flanged member including a hollow body, a first bendable portion on a first side of the body, and a second bendable portion on a second side of the body opposite the first side, the first and second bendable portions being in an unbent configuration in which each of the first and second bendable portions extend a first distance in a radial direction; bending the first bendable portion into a bent configuration such that the first bendable portion extends farther in the radial direction than the first distance; bending the second bendable portion into a bent configuration such that the second bendable portion extends farther in the radial direction than the first distance; and inserting a current collection protrusion through the hollow body of the flanged member, the current collection protrusion being electrically coupled to an electrode assembly of the secondary battery. At least one of bending the first bendable portion and bending the second bendable portion may be performed after the flanged member is inserted through the through hole and the insertion hole.

Further in the second aspect of the disclosure, the flanged member may be generally cylindrical when the flanged member is in the unbent configuration.

According to a third aspect of the disclosure, a secondary battery may include an electrode assembly, a case, and a cap assembly. The case may have the electrode assembly received therein. The cap assembly may be coupled to the case and may cover an opening of the case. The cap assembly may include a cap plate, a rivet part, a base insulating member, and a gasket. The cap plate may include a through hole. The rivet part may include a body part and an inner fastening portion. The body part may be positioned in the through hole and may extend toward an outside of the case. The inner fastening portion may extend from the body part between the cap plate and the electrode assembly. The base insulating member may be disposed between the cap plate and the electrode assembly. The gasket may be disposed between the cap plate and the rivet part. At least a part of the base insulating member and at least a part of the gasket may contact the inner fastening portion and extend parallel to each other between the cap plate and the inner fastening portion.

Further in the third aspect of the disclosure, the cap plate, the inner fastening portion of the rivet part, the base insulating member, and the gasket may be stacked in layers of the cap assembly. The at least a part of the base insulating member and the at least a part of the gasket may be disposed within a same layer of the cap assembly. The at least a part of the base insulating member and the at least a part of the gasket may have a same thickness. The inner fastening portion may include a first pressurization portion contacting the base insulating member and a second pressurization portion contacting the gasket.

Further in the third aspect of the disclosure, the base insulating member and the gasket may be disposed within a same layer of the cap assembly and spaced apart from each other. The cap assembly may define a space between the base insulating member and the gasket. The gasket may include a first sealing portion disposed between the body part and the cap plate. The gasket may include a second sealing portion extending from the first sealing portion along the common plane with the at least a part of the base insulating member.

Further in the third aspect of the disclosure, the secondary battery may further include an electrode terminal spaced from the cap plate. The rivet part may include an outer fastening portion bent from the body part and connected to the electrode terminal. The inner fastening portion may be bent from the body part between the gasket and the electrode assembly and may contact the gasket.

Further in the third aspect of the disclosure, the secondary battery may include a current collection plate and a current collection protrusion protruding from the current collection plate and positioned within a throughbore defined in the body part. The inner fastening portion may be disposed between the gasket and the current collection plate. The rivet part may include a rivet protrusion protruding toward the gasket. The gasket may include a fastening groove in which the rivet protrusion is received. The cap plate may include a hole protrusion part protruding toward the gasket. The gasket may include a groove in which the hole protrusion part is received. The base insulating member and the gasket may extend along a common plane. An outer surface of the base insulating member and an outer surface of the gasket may extend along the common plane. An inner surface of the base insulating member and an inner surface of the gasket may extend along the common plane.

According to a fourth aspect of the disclosure, a secondary battery may include an electrode assembly, a case, a cap assembly, and a current collection member. The electrode assembly may include an electrode tab. The case may have the electrode assembly received therein. The cap assembly may be coupled to the case and may cover an opening of the case. The current collection member may be coupled to the electrode tab and the cap assembly. The cap assembly may include a cap plate, a rivet part, and a gasket. The cap plate may include a through hole. The rivet part may include a body part positioned in the through hole and extending toward an outside of the case. The body part may have a throughbore therein. The gasket may include a first sealing portion disposed between the rivet part and the cap plate and a second sealing portion disposed between the current collection member and the cap plate. The current collection member may include a current collection protrusion positioned in the throughbore and a current collection plate extending from the current collection protrusion. The current collection plate may be disposed to overlap the second sealing portion and may pressurize the second sealing portion toward the cap plate.

Further in the fourth aspect of the disclosure, the rivet part may include an inner fastening portion contacting the second sealing portion and disposed between the current collection plate and the second sealing portion. The current collection plate may include a first current collection portion overlapping the second sealing portion and the inner fastening portion. The current collection plate may include a second current collection portion extending from the first current collection portion and positioned so as to not overlap the second sealing portion. The first sealing portion may be disposed between the cap plate and the current collection protrusion. The current collection protrusion may pressurize the first sealing portion toward the cap plate. The secondary battery may include a base insulating member disposed between the current collection plate and the cap plate. The current collection plate may pressurize the base insulating member toward the cap plate.

According to a fifth aspect of the disclosure, a secondary battery may include an electrode assembly, a case, and a cap assembly. The case may have the electrode assembly received therein. The cap assembly may be coupled to the case and may cover an opening of the case. The cap assembly may include a cap plate, a terminal insulating member, and an electrode terminal. The cap plate may include a plate body and a plate recess defined in the plate body. The terminal insulating member may include an insulating body stacked on the cap plate, an insulating member recess defined in the insulating body, and an insulating protrusion part received in the plate recess. The electrode terminal may include a terminal edge stacked on the terminal insulating member. The electrode terminal may have a terminal protrusion part received in the insulating member recess.

Further in the fifth aspect of the disclosure, the cap plate may include a plate step portion. The terminal insulating member may include an insulating step portion facing the plate step portion. The plate step portion and the insulating step portion may be spaced from each other. The cap assembly may define a space between the plate step portion and the insulating step portion. The electrode terminal may include a terminal step portion connecting the terminal protrusion part and the terminal edge. The cap plate, the terminal insulating member, and the electrode terminal may be stacked with respective step shapes.

The cap assembly of the secondary battery according to an aspect of the present disclosure can prevent the leakage of an electrolyte and simplify an assembly process by including the rivet part.

The secondary battery according to an aspect of the present disclosure can enhance sealing performance in an area near the rivet part because the gasket is disposed in the area near the rivet part.

The secondary battery according to an aspect of the present disclosure can reduce a thickness in the area near the rivet part because the gasket and the base insulating member are aligned in one direction.

The secondary battery according to an aspect of the present disclosure can improve an adhesive force with another part of the gasket because the gasket is pressurized by the fastening portion of the rivet part and the current collection plate.

BRIEF DESCRIPTION OF THE DRAWINGS

FIG. 3 is a perspective view illustrating an electrode assembly including a plurality of first and second electrode tabs in an electrode part in the secondary battery according to an aspect of the present disclosure.

FIG. 9A is perspective view sequentially illustrating a rivet part having another shape before and after being bent according to another aspect of the present disclosure.

FIG. 9B is a perspective view sequentially illustrating a rivet part having another shape before and after being bent according to another aspect of the present disclosure.

FIG. 9C is a perspective view sequentially illustrating a rivet part having another shape before and after being bent according to another aspect of the present disclosure.

DETAILED DESCRIPTION

Figure 1:
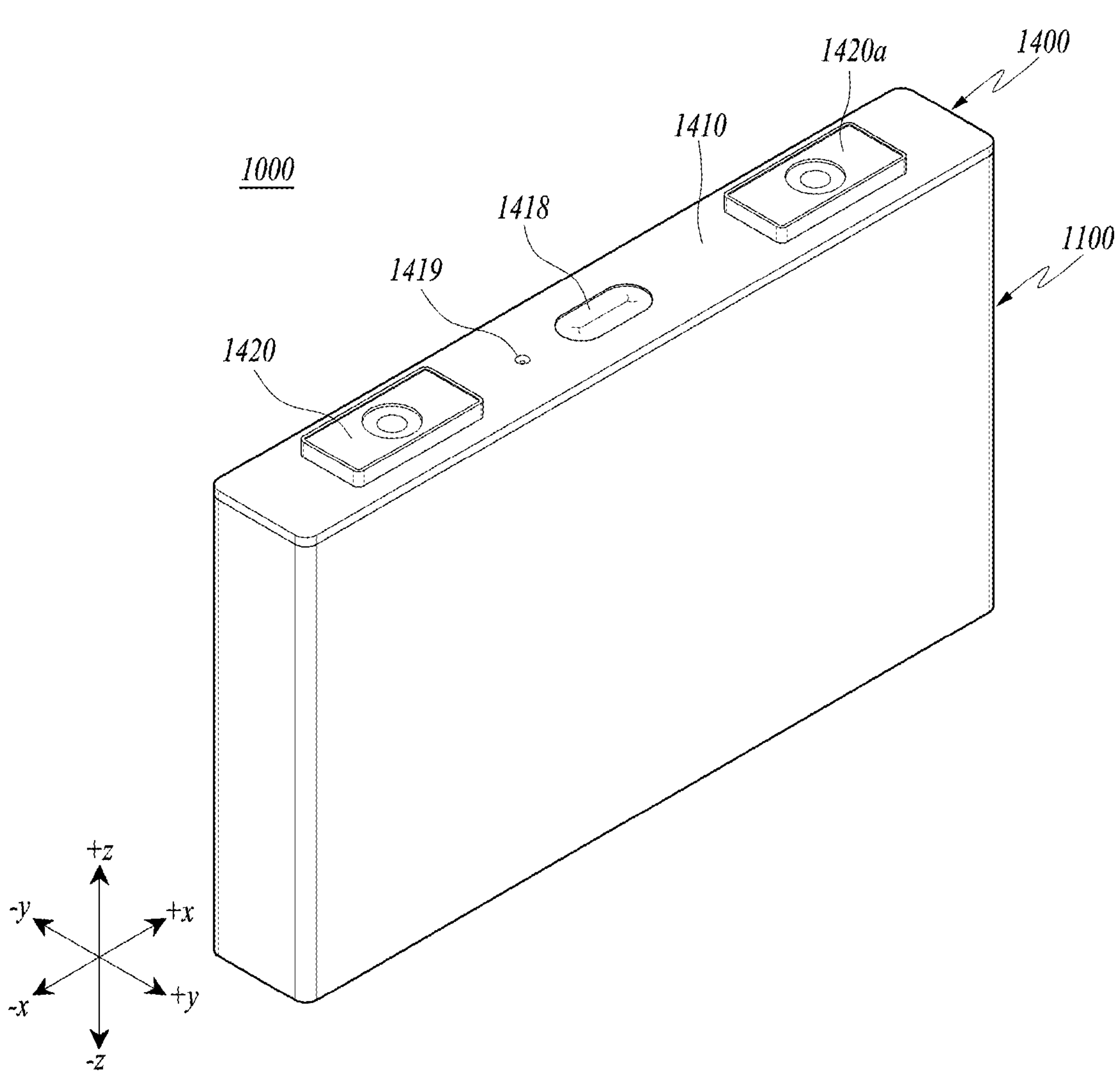
FIG. 1 is a perspective view illustrating a secondary battery according to an aspect of the present disclosure.

The present disclosure may be modified in various ways and may have various aspects. Specific aspects are to be illustrated in the drawings and to be described in the detailed description. It is however to be understood that the present disclosure is not intended to be limited to the specific aspects, but that the specific aspects include all of modifications, equivalents and/or substitutions included in the spirit and technical scope of the present disclosure.

The terms used in the present disclosure are used to only describe specific aspects and are not intended to restrict the present disclosure. An expression of the singular number should be construed as including an expression of the plural number unless clearly defined otherwise in the context. It is to be understood that in the present disclosure, a term, such as "include (or comprise)" or "have", is intended to designate the presence of a characteristic, a number, a step, an operation, a component, a part or a combination of them described in the specification and does not exclude the possible existence or addition of one or more other characteristics, numbers, steps, operations, components, parts or combinations of them in advance.

Hereinafter, aspects of the disclosure are described in detail with reference to the accompanying drawings. It is to be noted that the same reference numbers are used to refer to the same components in the accompanying drawings. Furthermore, a detailed description of known functions or constructions that may make the subject matter of the disclosure vague will be omitted. For the same reason, in the accompanying drawings, some components are enlarged, omitted or schematically depicted.

Directions for describing a secondary battery 1000 are defined. A first direction (i.e., a +Z or −Z direction) may be defined. The first direction (i.e., the +Z or −Z direction) may denote the "height direction of the secondary battery 1000". The first direction (i.e., the +Z or −Z direction) may be a direction toward the outside of the secondary battery 1000. The first direction (i.e., +Z or −Z direction) may be a direction into which a rivet part 1440 is inserted into a through hole 1411. A second direction (i.e., a +X, +Y, −X, or −Y direction) may be defined. The second direction (i.e., the +X, +Y, −X, or −Y direction) may be a direction perpendicular to the first direction (i.e., the +Z or −Z direction).

As illustrated in FIGS. 1 to 10A and 10B, the secondary battery 1000 according to an aspect of the present disclosure includes a case 1100, an electrode assembly 1200, a current collection member 1300, and a cap assembly 1400.

Figure 2:
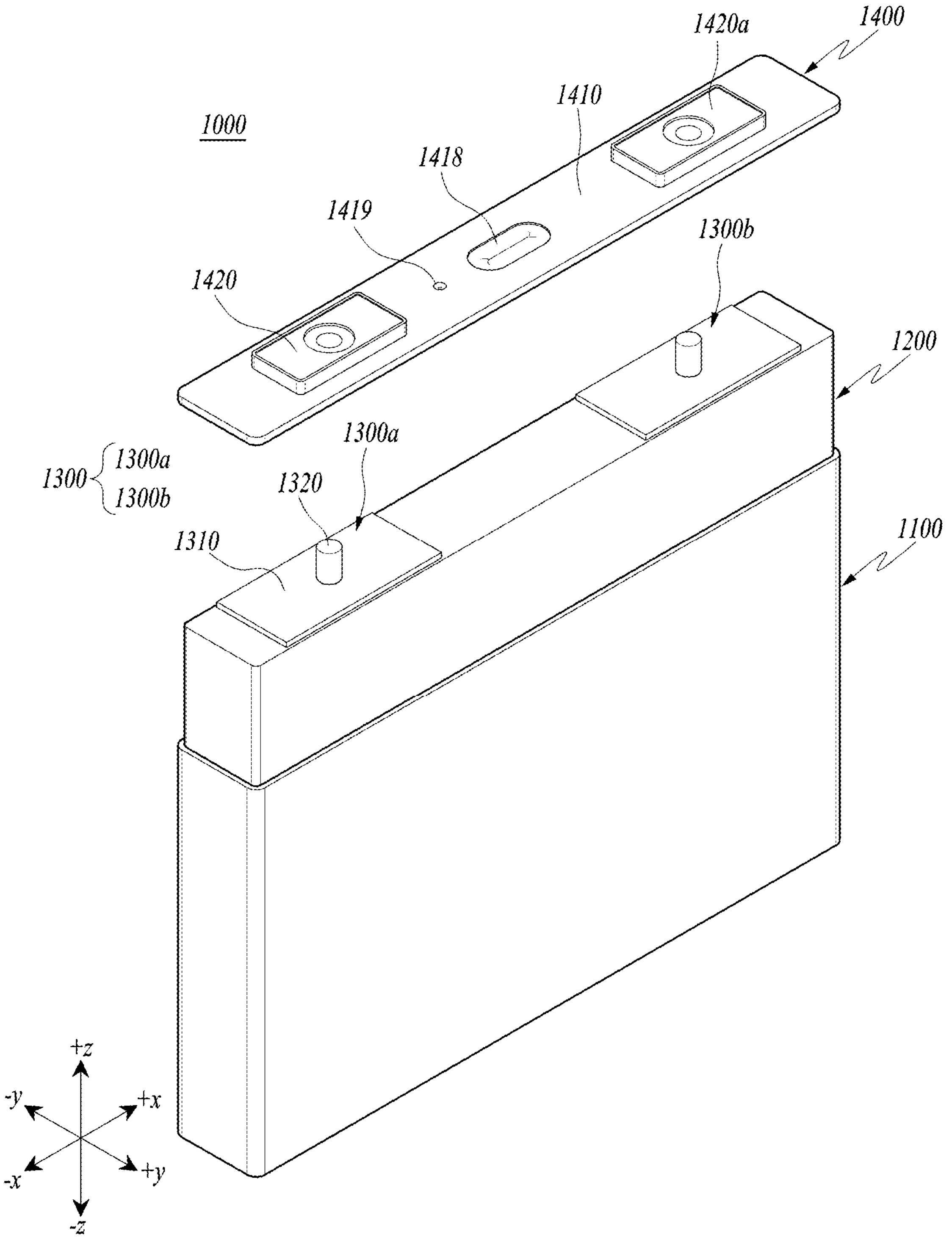
FIG. 2 is an exploded perspective view illustrating a cap assembly in the secondary battery according to the aspect of FIG. 1.

Referring to FIGS. 1 and 2, the case 1100 may define an outer appearance of the secondary battery 1000. The case 1100 may include a space formed therein in which the electrode assembly 1200 can be accommodated, and may include an opening formed in one surface thereof. In the present aspect, the case 1100 has a rectangular parallelepiped shape, but is not limited thereto and may be variously modified. The material of the case 1100 may be a solid material capable of protecting the electrode assembly 1200 accommodated in the case 1100. For example, the case 1100 may be made of metal, such as aluminum or stainless steel.

Referring to FIGS. 1 and 2, an electrolyte may be accommodated in the case 1100 along with the electrode assembly 1200. The electrolyte may be made of lithium salts, such as LiPF6 or LiBF4, in an organic solvent, such as EC, PC, DEC, EMC, or DMC. The electrolyte may be a liquid, a solid, or a gel phase.

Figure 3:
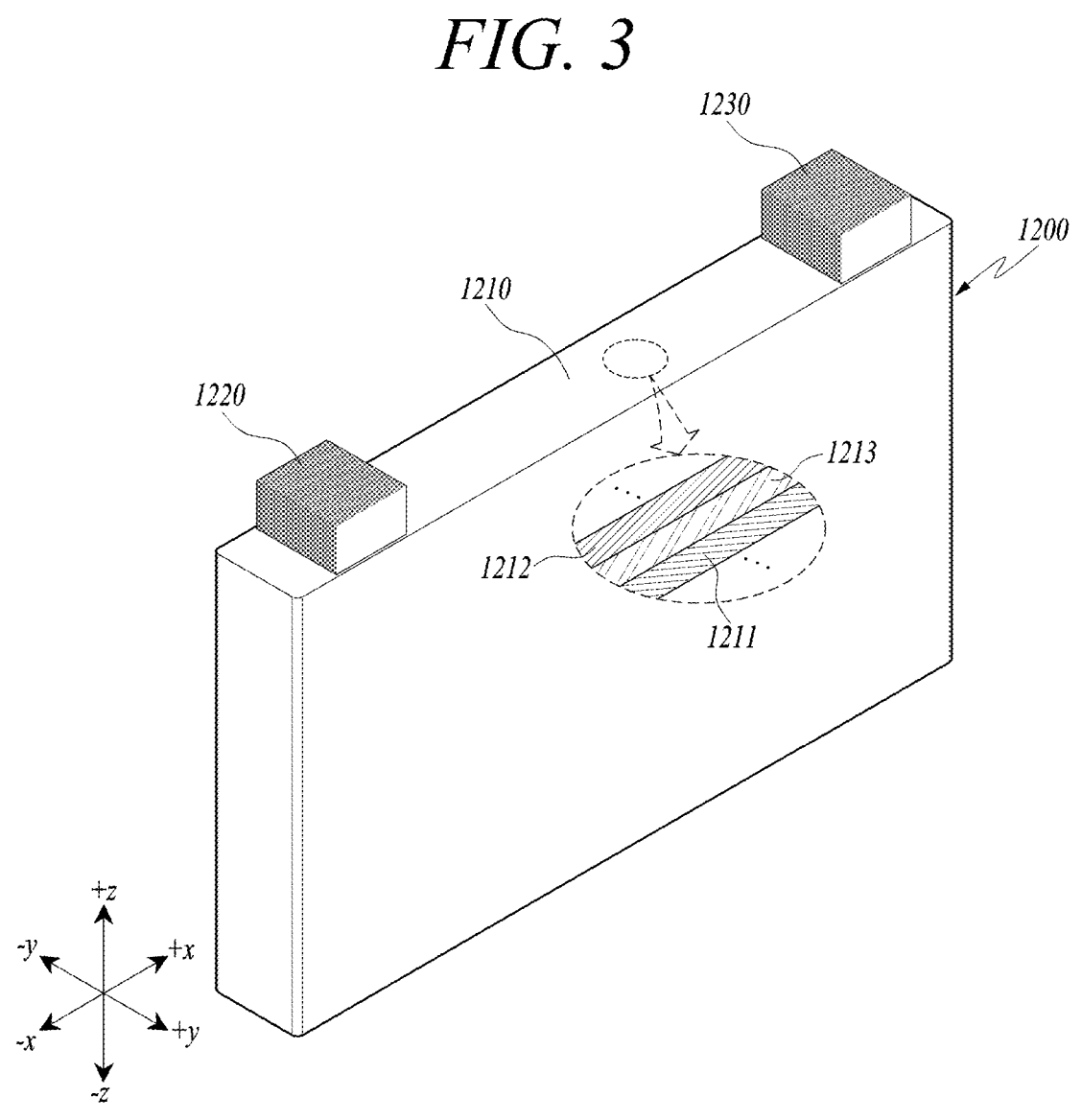

Referring to FIGS. 1 and 2, the electrode assembly 1200 may be accommodated in the case 1100. As illustrated in FIG. 3, the electrode assembly 1200 may include an electrode part 1210 and a plurality of electrode tabs 1220 and 1230.

It is noted that the electrode tabs as referenced throughout the disclosure may be formed uniformly or as a whole with the electrode collector, or may include a foil tab that can be formed by notching the electrode collector. In other examples, the electrode tab may be a member that is separately coupled to the electrode assembly.

Figure 4A:
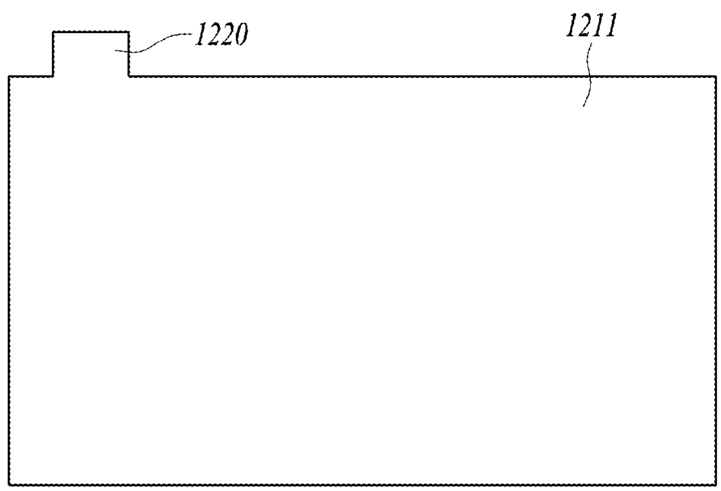
FIGS. 4A and 4B are elevation views illustrating a first electrode plate and a second electrode plate, respectively, in the secondary battery according to an aspect of the present disclosure.
Figure 4B:
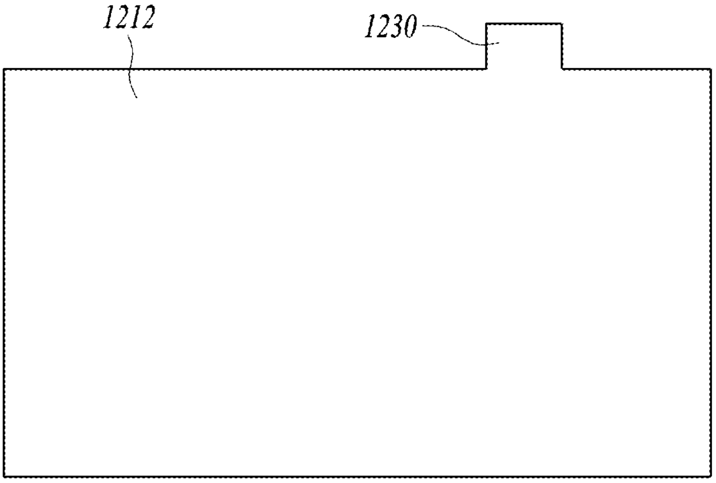

Referring to FIGS. 3-4B, the electrode part 1210 may include a plurality of first electrode plates 1211, a plurality of second electrode plates 1212, and a separator 1213. An active material may be applied to the plurality of first electrode plates 1211 and the plurality of second electrode plates 1212. An active material, such as transfer metal oxide, may be applied to the first electrode plate 1211, for example, a metal plate made of aluminum. The first electrode plate 1211 may be a positive electrode plate. An active material, such a graphite or carbon, may be applied to the second electrode plate 1212, for example, a metal plate made of copper or nickel. The second electrode plate 1212 may be a negative electrode plate.

Referring to FIGS. 3-4B, the separator 1213 is disposed between the plurality of first and second electrode plates 1211 and 1212, and can prevent a short-circuit between the plurality of first and second electrode plates 1211 and 1212. The material of the separator may be polyethylene, polypropylene, or composite materials thereof.

Referring to FIGS. 3-4B, the electrode part 1210 may be formed by disposing the separator 1213 between the first electrode plate 1211 and the second electrode plate 1212 that are sequentially disposed. That is, in an aspect, the first electrode plate 1211, the separator 1213, the second electrode plate 1212, and the separator 1213 may be sequentially stacked to define the electrode part 1210. In another aspect, the electrode part 1210 may be formed by sequentially arranging the first electrode plate 1211, the separator 1213, and the second electrode plate 1212 and then winding them.

In the present aspect, the electrode assembly 1200 has been described as including one electrode part 1210. In another aspect, the electrode assembly 1200 may include a plurality of electrode parts 1210. The plurality of electrode parts 1210 may be electrically connected.

Referring to FIGS. 3-4B, each of the electrode tabs 1220 and 1230, to which an active material has not been applied, may be formed at one end of each of the first and second electrode plates 1211 and 1212. A first electrode tab 1220 may be formed on the first electrode plate 1211. A second electrode tab 1230 may be formed on the second electrode plate 1212. In an aspect, the electrode plates 1211 and 1212 and the electrode tabs 1220 and 1230 may be integrally (e.g., monolithically) formed in a way to leave the electrode plates 1211 and 1212 and the electrode tabs 1220 and 1230 by cutting a predetermined portion of one metal plate by using a laser. The plurality of electrode tabs 1220 and 1230 may be arranged in a direction projecting toward the cap assembly 1400. That is, the electrode tabs 1220 and 1230 may extend in an upward direction (+z direction) relative to the respective electrode plates 1211 and 1212 when the electrode assembly 1200 is oriented in an upright position as shown in FIG. 3.

Referring to FIG. 3, when the plurality of first and second electrode plates 1211 and 1212 is stacked, the plurality of first electrode tabs 1220 may overlap at a first location (e.g., in the width direction), and the plurality of second electrode tabs 1230 may overlap at a second location (e.g., in the width direction). That is, the plurality of first electrode tabs 1220 having the same polarity may be grouped at the first location, and the plurality of second electrode tabs 1230 having the same polarity is grouped at the second location. The first location and the second location are spaced apart from each other on the electrode plate in a longitudinal direction. The plurality of first electrode tabs 1220 and the plurality of second electrode tabs 1230, each of which has been grouped, may thus be spaced apart from each other in the length direction of the electrode assembly 1200.

Figure 22:
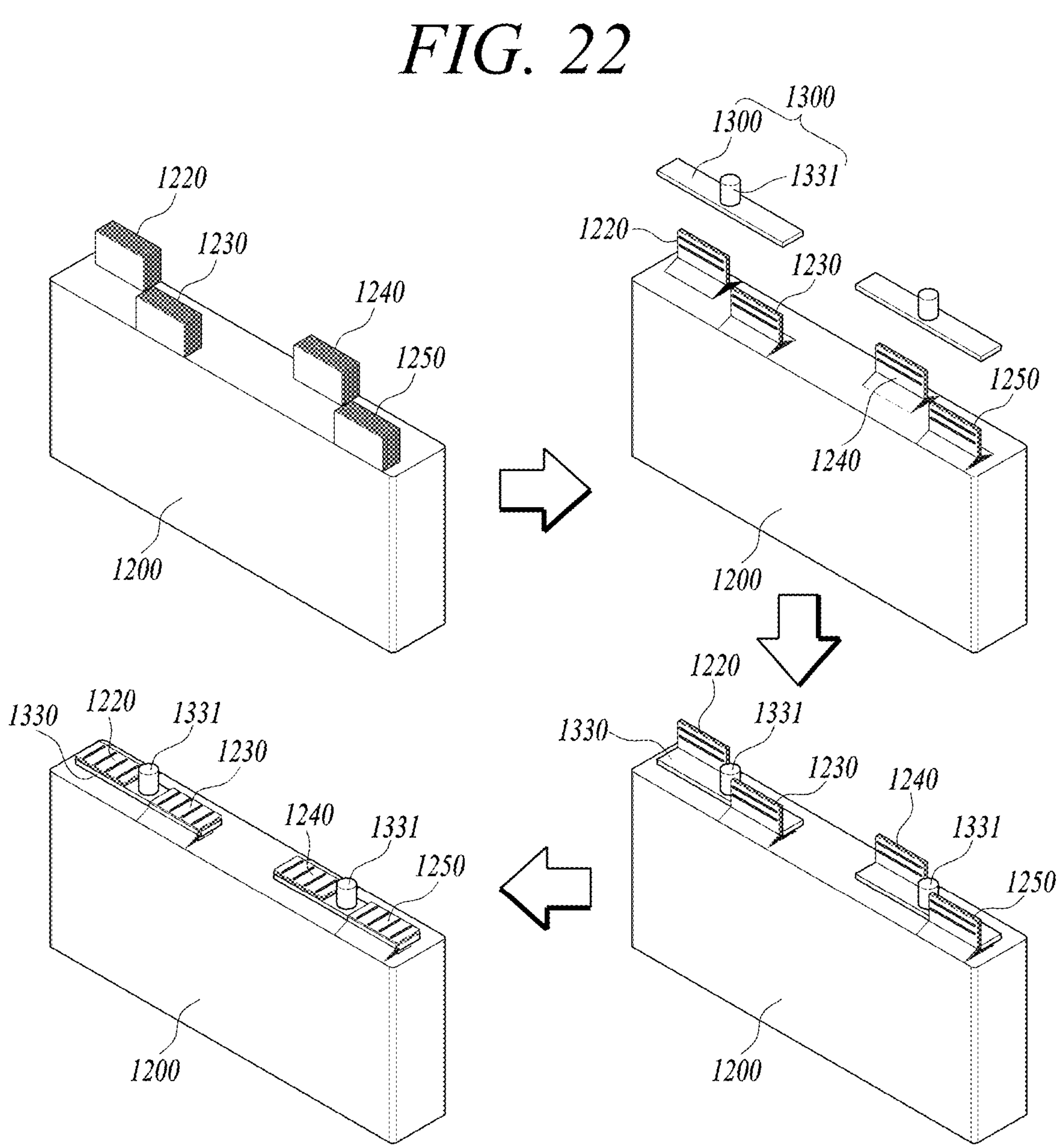
FIG. 22 is sequential perspective views illustrating electrode tabs having the same polarity bonded to a current collection member according to another aspect of the present disclosure.

As illustrated in FIG. 22, the plurality of first electrode tabs 1220 overlapped at the first location may be bonded together and the plurality of second electrode tabs 1230 overlapped at the second location may be bonded together, e.g., through ultrasonic welding or laser welding, in order to facilitate a movement of a current. The plurality of first electrode tabs 1220 that has been bonded together and the plurality of second electrode tabs 1230 that has been bonded together may be connected to the current collection member 1300.

Figure 19:
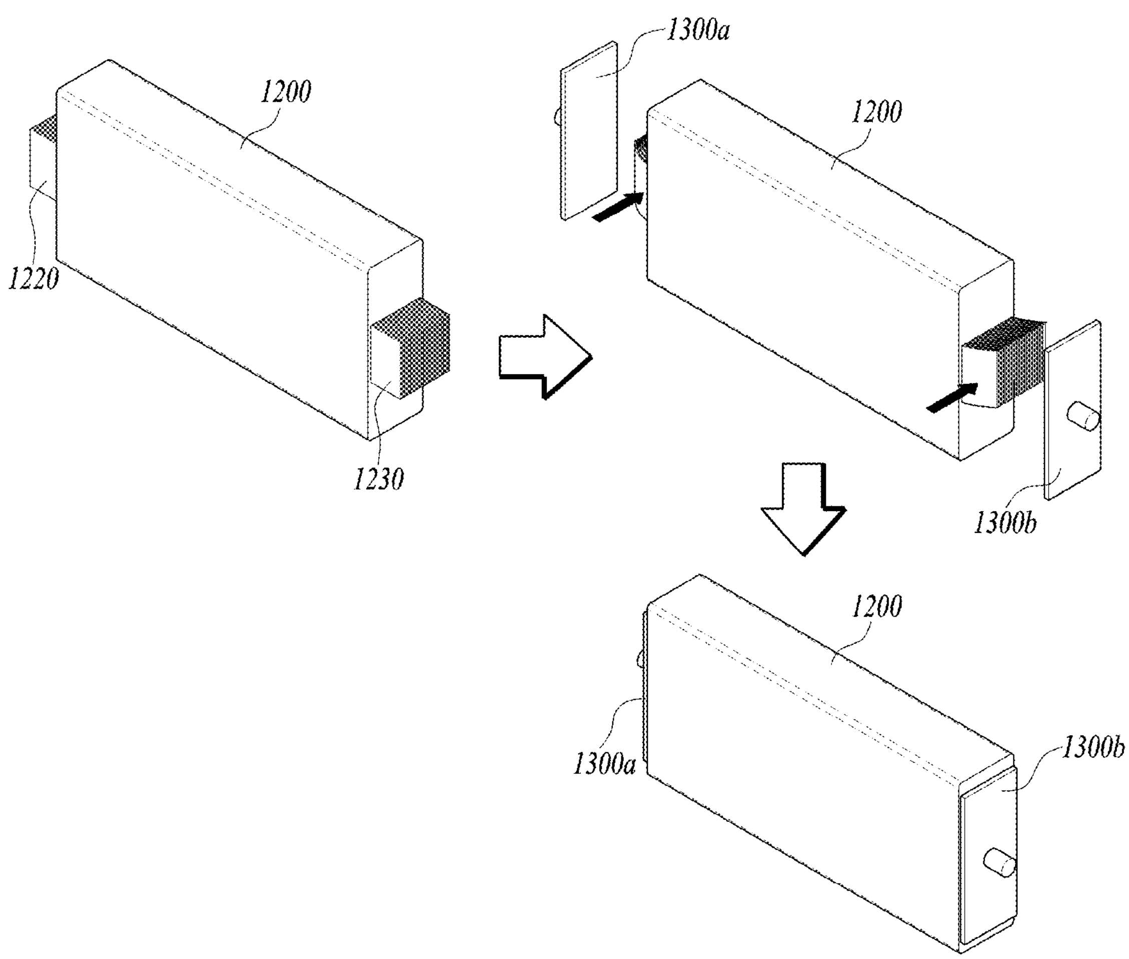
FIG. 19 is sequential perspective views illustrating a process of coupling the current collection member and the electrode tabs when the electrode tabs are formed in both directions of the electrode assembly in a secondary battery according to another aspect of the present disclosure.

In the present aspect, the first and second electrode tabs 1220 and 1230 may be disposed at one end of the electrode part 1210. In another aspect, the first electrode tabs 1220 may be disposed on one side of the electrode part 1210, and the second electrode tabs 1230 may be disposed on the opposite side of the electrode part 1210, such as illustrated in FIG. 19.

Referring to FIGS. 2 and 3, the current collection member 1300 may include a current collection plate 1310 and a current collection protrusion 1320. The current collection plate 1310 may be bonded to the plurality of electrode tabs 1220 and 1230, e.g., by welding. The current collection plate 1310 may include the same material as the plurality of electrode tabs 1220 and 1230. The current collection protrusion 1320 may be formed by protruding from one surface of the current collection plate 1310. An insulating material may be disposed under the current collection member 1300. The insulating material may be an insulating plate or an insulating film.

In the present aspect, the current collection member 1300 may include a first current collection member 1300*a* and a second current collection member 1300*b*. The first current collection member 1300*a* may be bonded to the first electrode tab 1220. The second current collection member 1300*b* may be bonded to the second electrode tab 1230. For the bonding of the current collection member 1300 and the electrode tabs 1220 and 1230, after the electrode tabs 1220 and 1230 are bent, the current collection member 1300 may be seated on the electrode tabs 1220 and 1230, and the current collection plate 1310 and the electrode tabs 1220 and 1230 may be welded to the current collection plate 1310, such as on the underside of the current collection plate 1310. A method for welding, such as ultrasonic welding or laser welding, may be used.

Figure 5:
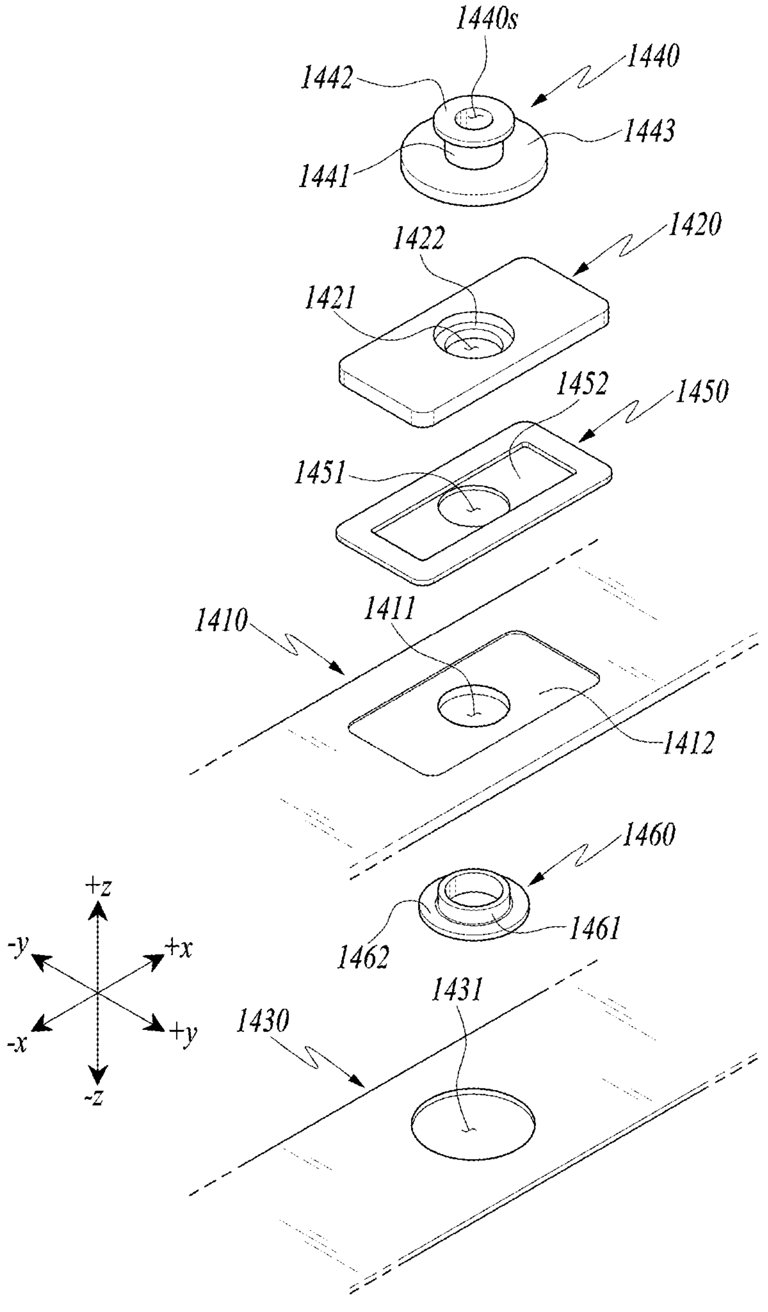
FIG. 5 is an exploded perspective view illustrating the cap assembly according to an aspect of the present disclosure.

Referring to FIGS. 1 and 2, the cap assembly 1400 is coupled to the case 1100 at the opening, and the cap assembly 1100 may seal the opening of the case 1100 in which the electrode assembly 1200 is accommodated. As illustrated in FIG. 5, the cap assembly 1400 may include a cap plate 1410, an electrode terminal 1420, a base insulating member 1430, and the rivet part 1440.

Referring to FIGS. 1 and 2, the cap plate 1410 may have a form of a plate that covers the opening of the case 1100. The cap plate 1410 may have a shape corresponding to a shape of the opening of the case 1100. The cap plate 1410 may be formed of the same material as the case 1100. The cap plate 1410 may be fixed to the case 1100 by a method, such as laser welding.

Referring to FIGS. 1 and 2, the cap plate 1410 may include a vent part 1418, and an electrolyte inlet 1419 may be formed in the cap plate 1410. The vent part 1418 may be opened when internal pressure of the case 1100 is greater than a reference or threshold value. In the present aspect, the vent part 1418 has been formed in the cap plate 1410, but the vent part 1418 may be formed in the case 1100 in another aspect. An electrolyte may be injected into the case 1100 through the electrolyte inlet 1419.

Referring to FIGS. 1 and 2, the electrode terminal 1420 may be seated over the cap plate 1410. In the present aspect, the electrode terminal 1420 may have a rectangular plate shape, but is not limited thereto and may have various shapes.

Figure 6:
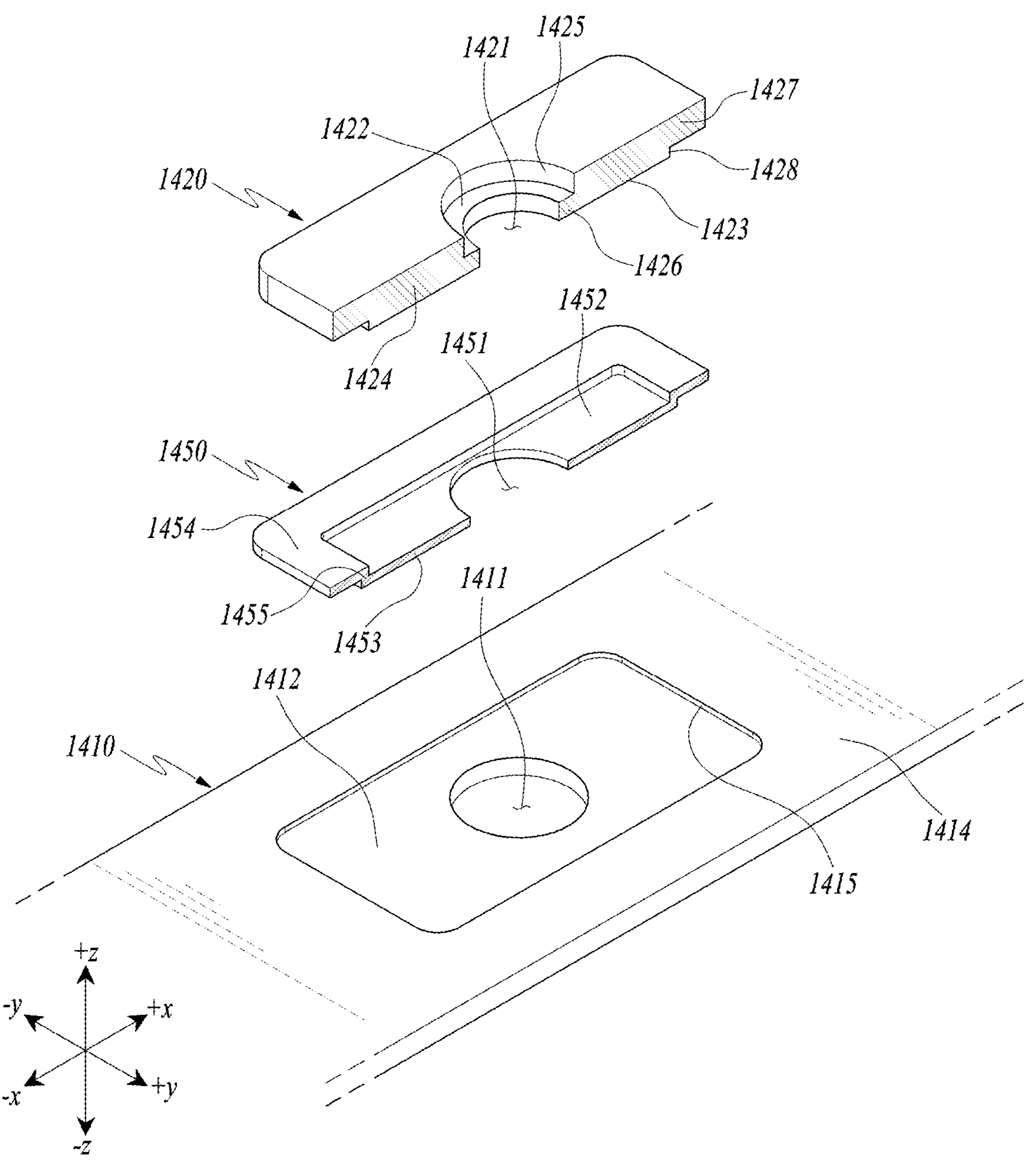
FIG. 6 is an exploded, partially-sectional diagram conceptually illustrating how an electrode terminal and a terminal insulating member are arranged for seating in a cap plate according to an aspect of the present disclosure.

Referring to FIGS. 5 and 6, the cap plate 1410 may include a through hole 1411. The through hole 1411 may communicate with the internal space of the case (e.g., the case 1100 in FIG. 2). The through hole 1411 may face the electrode assembly (e.g., the electrode assembly 1200 in FIG. 2). The rivet part 1440 may be inserted into the through hole 1411. The rivet part 1440 may penetrate the through hole 1411 in the first direction (e.g., the +Z direction). The rivet 1440 may be formed of a monolithic unit which may be generally cylindrical prior to the formation of the outer and inner fastening portions 1442, 1443. That is, the bottom portion of a cylindrical piece may be bent toward an opposite side of the cylindrical piece and in the radially outward direction to form the inner fastening portion 1443, and the top portion of the cylindrical piece may be bent toward the opposite side of the cylindrical piece and in the radially outward direction to form the outer fastening portion 1442, thereby forming the rivet 1440.

Referring to FIGS. 5 and 6, the cap plate 1410 may include a plate recess 1412. The through hole 1411 may be opened and formed in the plate recess 1412. The cap plate 1410 may include a plate body 1414. The plate body 1414 may have a flat plate shape. The plate recess 1412 may be formed by being depressed from one surface of the plate body 1414, e.g., from the upper surface of the plate body 1414 towards the interior of the case 1100. The cap plate 1410 may include a plate step portion 1415. The plate step portion 1415 may connect the plate recess 1412 and the plate body 1414. The plate step portion 1415 may be a part of the cap plate 1410 that is formed in the first direction (e.g., the +Z direction).

Figure 7:
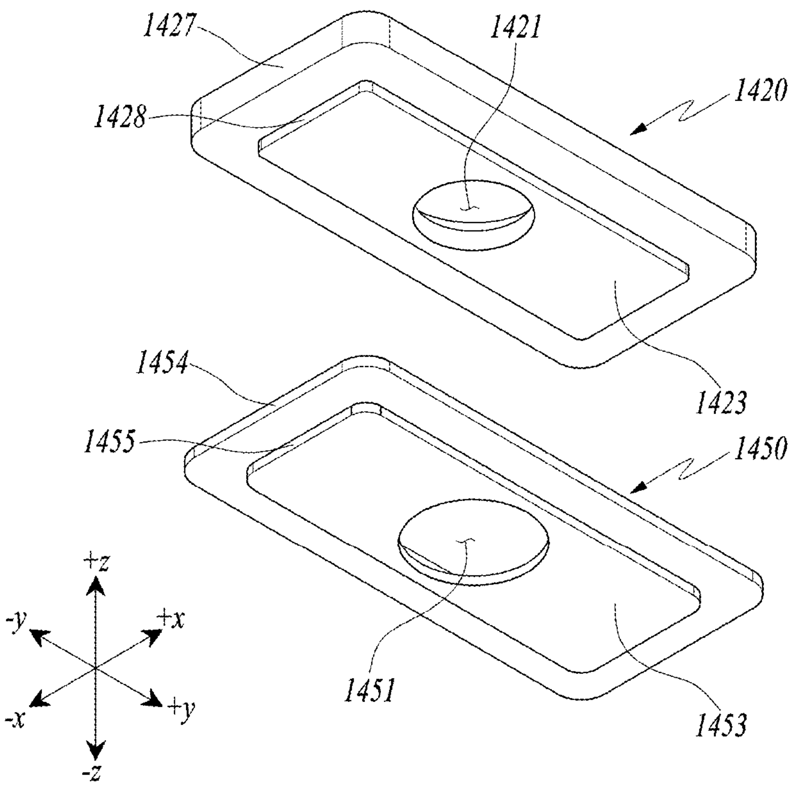
FIG. 7 is an exploded, partially-sectional diagram illustrating the bottoms of the electrode terminal and the terminal insulating member according to the aspect of FIG. 6.

Referring to FIGS. 5, 6, and 7, the electrode terminal 1420 may include an insertion hole 1421. The insertion hole 1421 may communicate with the through hole 1411. The rivet part 1440 may be inserted into the insertion hole 1421. At least a part of the rivet part 1440 may be placed inside the insertion hole 1421. When the electrode terminal 1420 is seated over the cap plate 1410, the through hole 1411 and the insertion hole 1421 may communicate with each other. The through hole 1411 and the insertion hole 1421 may have the same central axis. The radius of the through hole 1411 may be greater than the radius of the insertion hole 1421.

Referring to FIGS. 5, 6, and 7, the electrode terminal 1420 may include a seated portion 1422, which may be recessed within an upper surface of the electrode terminal 1420. The insertion hole 1421 may be opened and positioned inside the seated portion 1422. An outer fastening portion 1442 of the rivet part 1440 may be seated in the seated portion 1422.

Referring to FIGS. 5, 6, and 7, the electrode terminal 1420 may include a terminal protrusion part 1423. The electrode terminal 1420 may include a terminal body 1424. The terminal protrusion part 1423 may protrude from the terminal body 1424 toward the cap plate 1410. The terminal protrusion part 1423 may come into contact with a terminal insulating member 1450. The electrode terminal 1420 may include a first circumference wall 1425 and a second circumference wall 1426. The diameter of the first circumference wall 1425 may be greater than the diameter of the second circumference wall 1426. The insertion hole 1421 may refer to a space that is surrounded by the first circumference wall 1425 and the second circumference wall 1426. At least a part of the rivet part 1440 may be surrounded by the first circumference wall 1425 and the second circumference wall 1426. For example, the outer fastening portion 1442 of the rivet part 1440 may be surrounded by the first circumference wall 1425 when the secondary battery 1000 is assembled. The body part 1441 of the rivet part 1440 may be surrounded by the second circumference wall 1426 when the secondary battery 1000 is assembled. The electrode terminal 1420 may include a terminal edge 1427. The terminal edge 1427 may be a part of the terminal body 1424 that forms the side of the terminal body 1424. The terminal edge 1427 may protrude farther in the second direction (e.g., the +X direction) than the terminal protrusion part 1423. The electrode terminal 1420 may include a terminal step portion 1428. The terminal step portion 1428 may connect the terminal protrusion part 1423 and the terminal edge 1427. The terminal step portion 1428 may be a part of the electrode terminal 1420 that is formed in the first direction (e.g., the +Z direction).

Referring to FIG. 5, the base insulating member 1430 may be disposed between the cap plate 1410 and an electrode assembly (e.g., the electrode assembly 1200 in FIG. 2). The base insulating member 1430 may have a form of a plate having the same length and width as the cap plate 1410. The base insulating member 1430 may insulate the cap plate 1410 and the electrode assembly 1200. The base insulating member 1430 may insulate a current collection plate (e.g., the current collection plate 1310 in FIG. 2) and the rivet part 1440. The base insulating member 1430 may be disposed between the current collection plate 1310 and the rivet part 1440. The base insulating member 1430 may include a base hole 1431 at a location corresponding to the through hole 1411 of the cap plate 1410 such that the base hole 1431 aligns with the through hole 1411 when the secondary battery 1000 is assembled. The diameter of the base hole 1431 may be greater than the diameter of the through hole 1411. An exhaust hole may be formed at a location of the base insulating member 1430, which corresponds to a bent part (e.g., the bent part 1418 in FIG. 2) of the cap plate 1410. A guide hole may be formed at a location corresponding to an electrolyte injection hole (e.g., the electrolyte injection hole 1419 in FIG. 2).

Referring to FIG. 5, the rivet part 1440 may include the body part 1441, the outer fastening portion 1442, and an inner fastening portion 1443. The outer fastening portion 1442 and the inner fastening portion 1443 may each be named a "fastening portion". The body part 1441 may include an throughbore 1440*s*. A current collection protrusion (e.g., the current collection protrusion 1320 in FIG. 2) of the current collection member (e.g., the current collection member 1300 in FIG. 2) may be inserted into the throughbore 1440*s*. The body part 1441 may be inserted into the through hole 1411 and the insertion hole 1421. The outer fastening portion 1442 may be named any one of a "loop", an "engagement part", a "rim part", a "fastening portion", or an "outer flange". The inner fastening portion 1443 may be named any one of a "support part", an "extension portion", a "pressurization part", a "base", or an "inner flange".

Referring to FIG. 5, the outer fastening portion 1442 may be bent toward the electrode terminal 1420 on one side of the body part 1441. The outer fastening portion 1442 may be seated in the seated portion 1422. The outer fastening portion 1442 seated in the seated portion 1422 may be welded to the electrode terminal 1420 along the circumference thereof. In the present aspect, the length of the seated portion 1422 in the first direction (e.g., the +Z direction) may be greater than the length of the outer fastening portion 1442 in the first direction (e.g., the +Z direction). That is, the seated portion 1422 may extend further in the first direction (e.g., the +Z direction) than the outer fastening portion 1442. Accordingly, the outer fastening portion 1442 may be spaced apart from the top of the electrode terminal 1420 in the first direction (i.e., the +Z direction). The body part 1441 may be surrounded by a second circumference wall (e.g., the second circumference wall 1426 in FIG. 6) of the electrode terminal 1420. The outer fastening portion 1442 may be extended to the outside of the body part 1441 in a radial direction thereof. The outer fastening portion 1442 may be surrounded by a first circumference wall (e.g., the first circumference wall 1425 in FIG. 6) of the electrode terminal 1420 having a greater internal diameter than the second circumference wall 1426.

Referring to FIG. 5, the inner fastening portion 1443 may be bent toward the base insulating member 1430 on the other side of the body part 1441 (e.g., the side of the body part 1441 opposite that of the outer fastening portion 1442). The inner fastening portion 1443 may come into contact with the base insulating member 1430 under the base insulating member 1430.

Figure 8A:
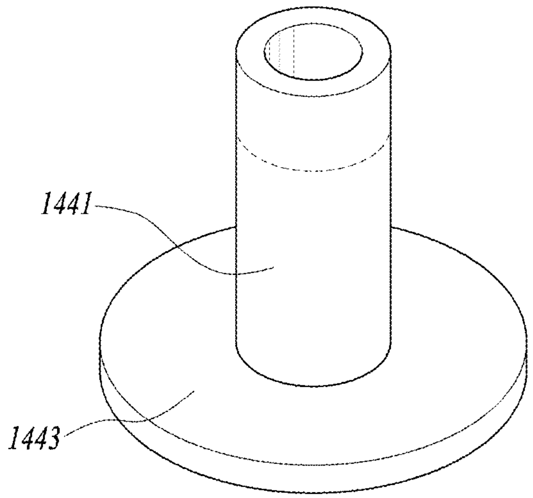
FIGS. 8A and 8B are perspective views sequentially illustrating a rivet part before and after being bent, respectively, according to an aspect of the present disclosure.
Figure 8B:
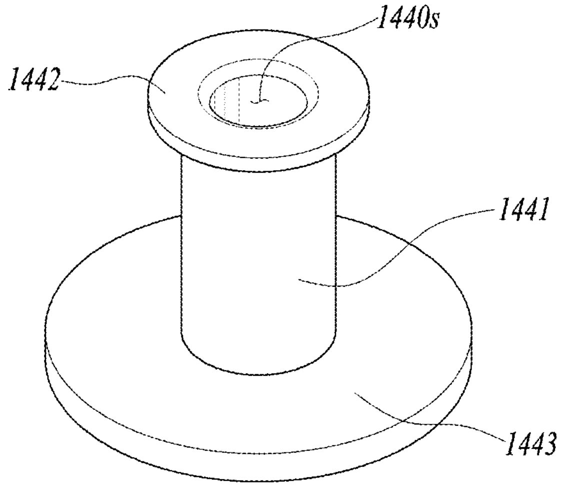

Referring to FIG. 5, the rivet part 1440 is inserted into the through hole 1411 and the insertion hole 1421 in the state in which the inner fastening portion 1443 has been formed on the other side of the body part 1441 (e.g., the inner fastening portion 1443 has been formed to flare in a radially outward direction such that it has a maximum radius greater than that of the body part 1441 on a side of the body part 1441 opposite that of the outer fastening portion 1442). Thereafter, as illustrated in FIGS. 8A-B, the outer fastening portion 1442 is formed by pressurizing and bending one side of the body part 1441. When the outer fastening portion 1442 is pressurized and bent as described above, the inner fastening portion 1443 may be formed to be thicker than the outer fastening portion 1442 in the first direction (e.g., the +Z direction). Furthermore, the inner fastening portion 1443 in the second direction (e.g., the +X direction) may be formed to have a longer length (or radius) than the outer fastening portion 1442 in the second direction (e.g., the +X direction).

Figures 9A, 9B, 9C:
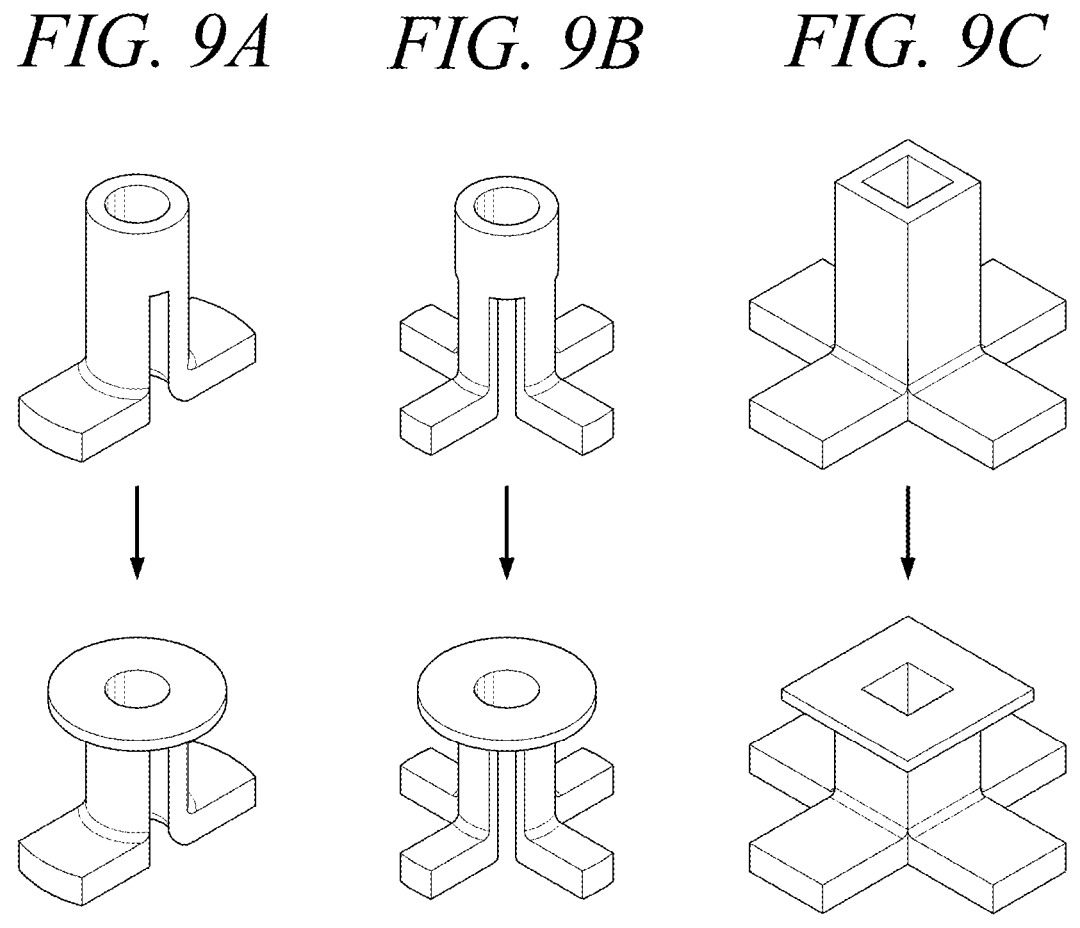

As illustrated in FIGS. 9A-C, the rivet part 1440 may have various shapes. The body part 1441 of the rivet part 1440 may have various shapes, such as a cylinder and a square column. In this case, each of the through hole 1411 and the insertion hole 1421 may have the same cross-sectional shape as the body part 1441. Shapes of the outer fastening portion 1442 and the inner fastening portion 1443 may be changed depending on a shape of the body part 1441. The inner fastening portion 1443 may be divided into a plurality of portions in order to facilitate bending. The outer fastening portion 1442 may also be divided into a plurality of portions. However, for sealing, the outer fastening portion 1442 may be integrally (e.g., monolithically) formed.

Referring to FIG. 5, after the rivet part 1440 is mounted on the cap assembly 1400, the outer fastening portion 1442 and the inner fastening portion 1443 may be pressurized in the direction of the cap plate 1410. Accordingly, the airtightness of the cap assembly 1400 can be increased because components that constitute the cap assembly 1400 are closely fit together.

Referring to FIGS. 5, 6, and 7, the cap assembly 1400 may include a terminal insulating member 1450. The terminal insulating member 1450 may be disposed between the electrode terminal 1420 and the cap plate 1410. The terminal insulating member 1450 may insulate the cap plate 1410 and the electrode terminal 1420. The terminal insulating member 1450 may have a shape that fully surrounds the side of the electrode terminal 1420 in the first direction (e.g., the +Z direction), or alternatively may have a shape that surrounds only a part of the side of the electrode terminal 1420 in the first direction (e.g., the +Z direction), according to circumstances. The terminal insulating member 1450 may include a terminal insulating member hole 1451 at a location corresponding to the through hole 1411 of the cap plate 1410 such that the terminal insulating member hole 1451 is aligned with the through hole 1411 when the secondary battery 1000 is assembled. The diameter of the terminal insulating member hole 1451 may be the same or smaller than the diameter of the through hole 1411.

Referring to FIGS. 5, 6, and 7, the terminal insulating member 1450 may include an insulating member recess 1452. The insulating member recess 1452 may be formed in an upper surface of the terminal insulating member 1450. The terminal insulating member hole 1451 may be opened and positioned in the insulating member recess 1452. At least a part of the electrode terminal 1420 may be seated in the insulating member recess 1452. The terminal protrusion part 1423 may be accommodated in a space that is formed inside the insulating member recess 1452. As the terminal protrusion part 1423 is seated in the insulating member recess 1452, the assembly of the electrode terminal 1420 and the terminal insulating member 1450 can be facilitated, and the relative location of the electrode terminal 1420 to the terminal insulating member 1450 can be fixed.

Referring to FIGS. 5, 6, and 7, the terminal insulating member 1450 may include an insulating protrusion part 1453 that protrudes in the direction of the cap plate 1410. The insulating protrusion part 1453 may be seated in the plate recess 1412 of the cap plate 1410. The insulating protrusion part 1453 may be accommodated in a space that is formed inside the plate recess 1412.

Referring to FIGS. 5, 6, and 7, the terminal insulating member 1450 may include an insulating body 1454. The insulating member recess 1452 may be formed by being depressed from the insulating body 1454. The terminal insulating member 1450 may include an insulating step portion 1455. The insulating step portion 1455 may connect the insulating protrusion part 1453 and the insulating body 1454. The insulating step portion 1455 may be a part of the terminal insulating member 1450 that is formed in the first direction (e.g., the +Z direction).

Figure 10A:
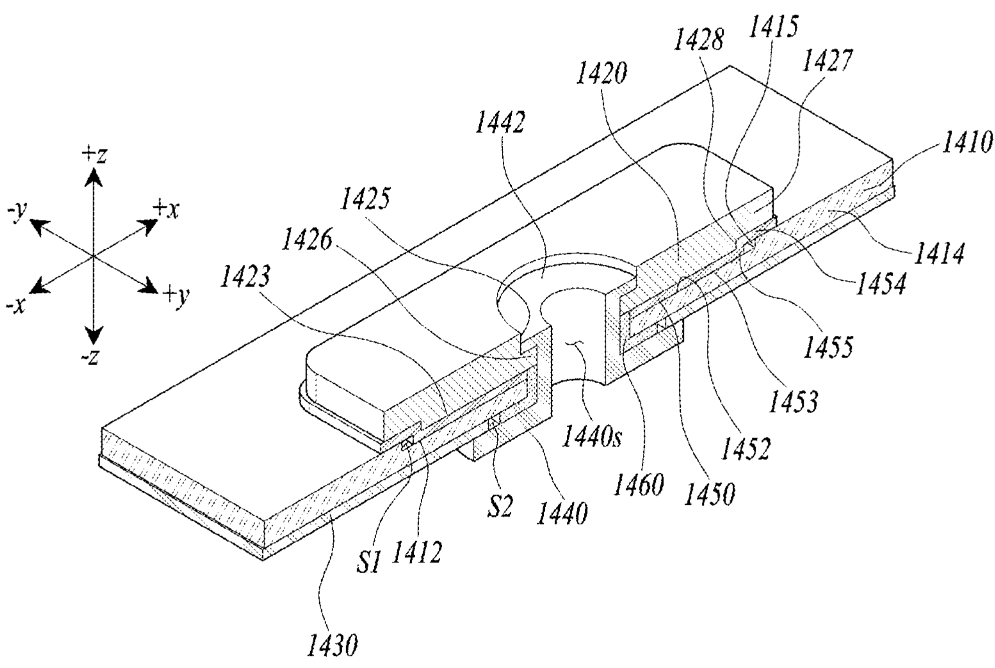
FIG. 10A is a perspective view illustrating a cross-section of the cap assembly according to an aspect of the present disclosure.
Figure 10B:
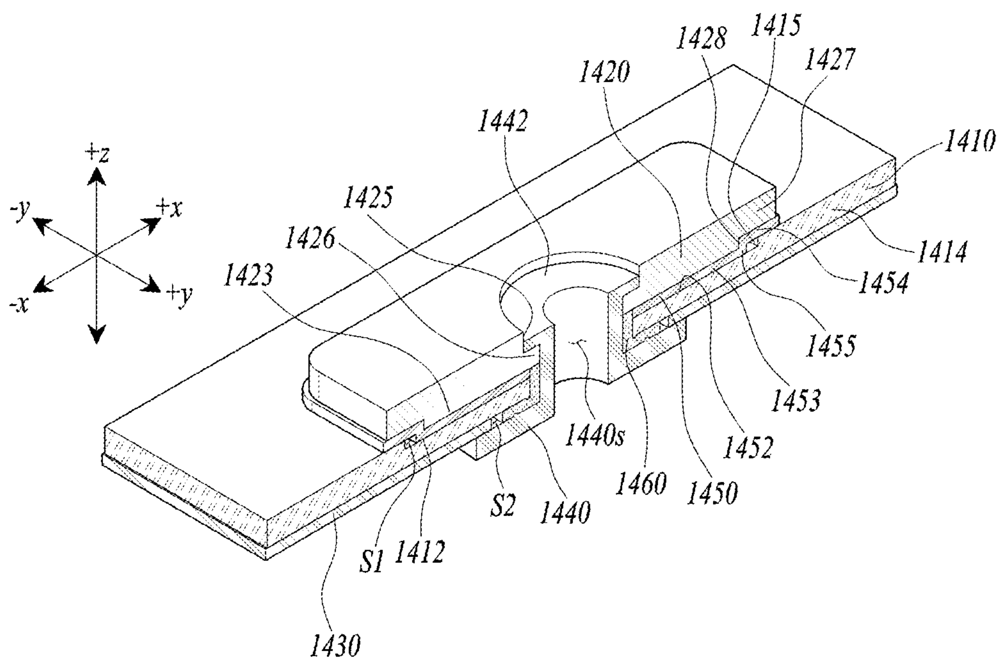
FIG. 10B is a perspective view illustrating a cross-section of a cap assembly according to another aspect of the present disclosure.
Figure 11A:
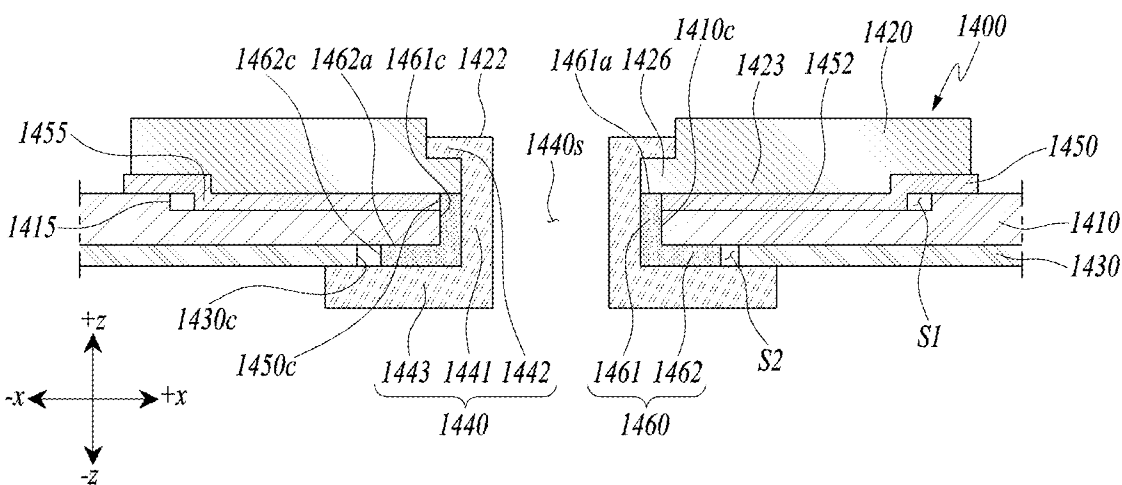
FIG. 11A is a cross-sectional elevation view illustrating a cap assembly according to an aspect of the present disclosure.
Figure 11B:
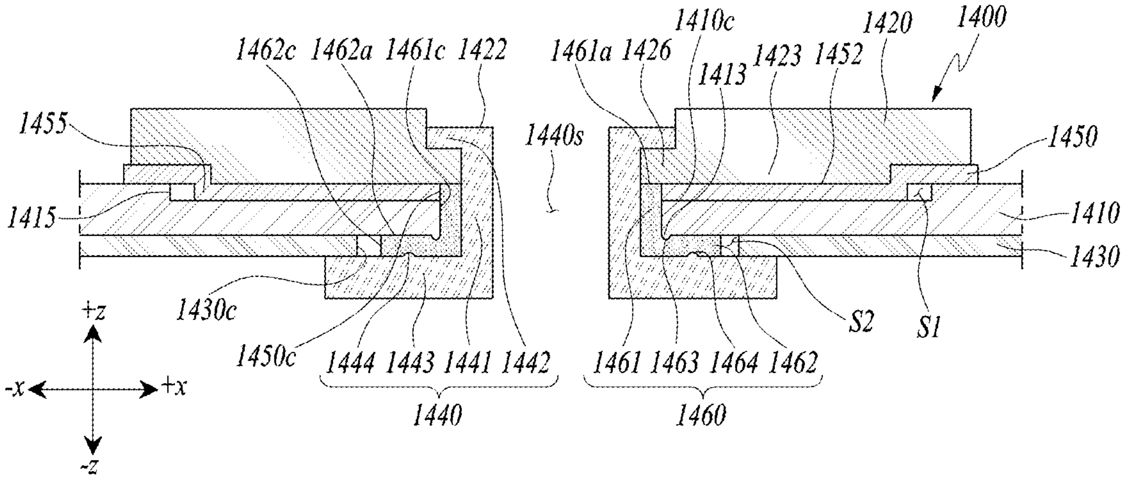
FIG. 11B is a cross-sectional elevation view illustrating a cap assembly according to another aspect of the present disclosure.
Figure 12A:
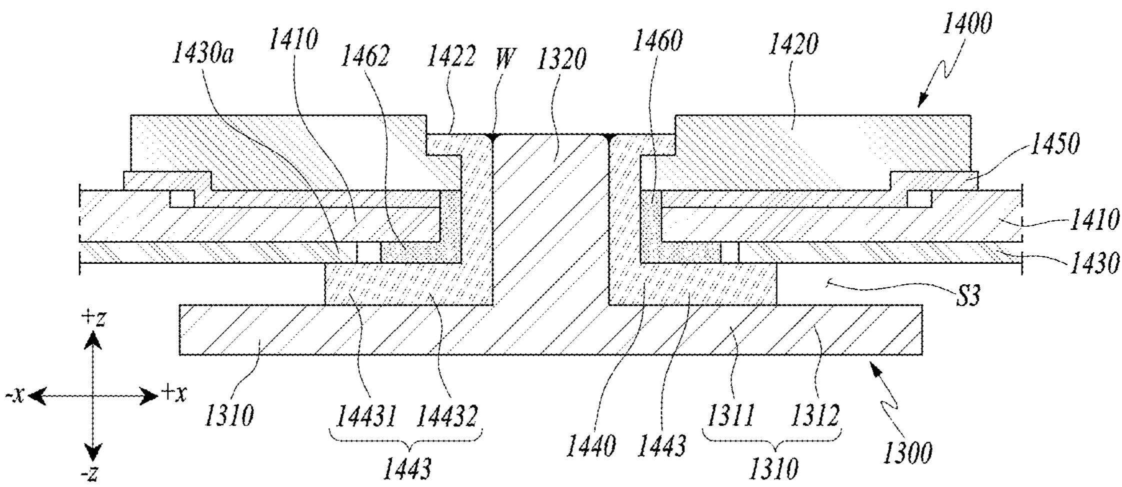
FIG. 12A is a cross-sectional elevation view illustrating a state in which an electrode terminal has been inserted into the cap assembly according to an aspect of the present disclosure.
Figure 12B:
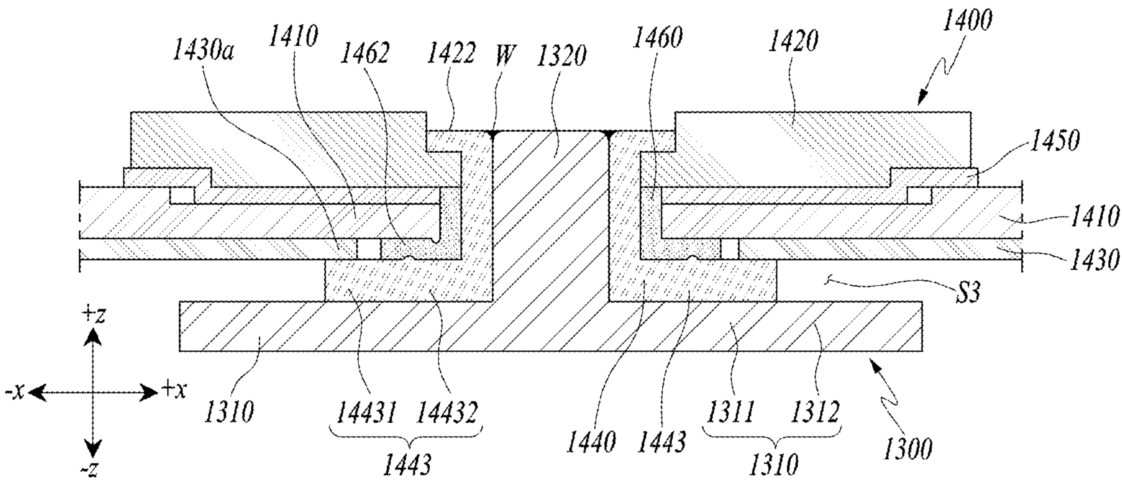
FIG. 12B is a cross-sectional elevation view illustrating a state in which the electrode terminal has been inserted into the cap assembly according to another aspect of the present disclosure.

FIG. 10A is a perspective view illustrating a cross section of a structure in which the cap plate 1410, the electrode terminal 1420, the base insulating member 1430, the rivet part 1440, the terminal insulating member 1450, and a gasket 1460 have been assembled. FIG. 10B is a perspective view illustrating a cross section of a structure in which the cap plate 1410, the electrode terminal 1420, the base insulating member 1430, the rivet part 1440, the terminal insulating member 1450, and the gasket 1460 have been assembled according to another aspect of the present disclosure. FIG. 11A is a cross-sectional elevation view of the structure of FIG. 10A. FIG. 11B is a cross-sectional elevation view of the structure of FIG. 10B. FIG. 12A is a cross-sectional elevation view illustrating the state in which the current collection member 1300 has been assembled with the structure of FIG. 11A. FIG. 12B is a cross-sectional elevation view illustrating the state in which the current collection member 1300 has been assembled with the structure of FIG. 11B.

The cap plate 1410, the electrode terminal 1420, the base insulating member 1430, and the terminal insulating member 1450 may be stacked together. For example, the base insulating member 1430, the cap plate 1410, the terminal insulating member 1450, and the electrode terminal 1420 may be sequentially stacked in the first direction (e.g., the +Z direction). Accordingly, the terminal insulating member 1450 may be nested inside the cap plate 1410, and the electrode terminal 1420 may be nested inside the terminal insulating member 1450.

The terminal insulating member 1450 may be stacked in the first direction (e.g., the +Z direction) of the cap plate 1410. The insulating protrusion part 1453 of the terminal insulating member 1450 may be seated in the plate recess 1412 of the cap plate 1410. The plate step portion 1415 may face the insulating step portion 1455. The plate step portion 1415 and the insulating step portion 1455 may be aligned in the second direction (e.g., the +X direction). For example, the plate step portion 1415 and the insulating step portion 1455 may have the same length in the first direction (e.g., the +Z direction), and may be placed at the same height in the first direction (e.g., the +Z direction). The plate step portion 1415 and the insulating step portion 1455 may be spaced apart from each other in the second direction (i.e., the +X direction). A space S1 may be formed between the plate step portion 1415 and the insulating step portion 1455. The cap assembly 1400 according to an aspect of the present disclosure may facilitate the assembly of the cap plate 1410 and the terminal insulating member 1450 due to the aforementioned structure. For example, as the space S1 is formed between the cap plate 1410 and the terminal insulating member 1450, a force that is necessary for the assembly of the cap plate 1410 and the terminal insulating member 1450 can be reduced because friction between the cap plate 1410 and the terminal insulating member 1450 is reduced. Furthermore, the cap assembly 1400 according to an aspect of the present disclosure can reduce the thickness of the cap assembly 1400 due to the aforementioned structure. For example, as the insulating protrusion part 1453 is seated in the plate recess 1412 and the plate step portion 1415 and the insulating step portion 1455 are placed at the same height, the relative location of the terminal insulating member 1450 to the cap assembly 1410 can be fixed and a thickness that is occupied by the cap assembly 1410 and the terminal insulating member 1450 can also be reduced.

The electrode terminal 1420 may be stacked in the first direction (e.g., the +Z direction) of the terminal insulating member 1450. The terminal protrusion part 1423 of the electrode terminal 1420 may be seated in the insulating member recess 1452 of the terminal insulating member 1450. The insulating step portion 1455 may face the terminal step portion 1428. The insulating step portion 1455 and the terminal step portion 1428 may be aligned in the second direction (e.g., the +X direction). For example, the insulating step portion 1455 and the terminal step portion 1428 may have the same length in the first direction (e.g., the +Z direction), and may be placed at the same height in the first direction (e.g., the +Z direction). The terminal edge 1427 of the electrode terminal 1420 may be seated in the insulating body 1454 of the terminal insulating member 1450. The insulating body 1454 may be disposed between the terminal edge 1427 and the plate body 1414, and may be pressurized by the terminal edge 1427 and the plate body 1414. The cap assembly 1400 according to an aspect of the present disclosure can reduce the thickness of the cap assembly 1400 due to the aforementioned structure. For example, as the terminal protrusion part 1423 is seated in the insulating member recess 1452 and the insulating step portion 1455 and the terminal step portion 1428 are placed at the same height, the relative location of the electrode terminal 1420 to the terminal insulating member 1450 can be fixed and a thickness that is occupied by the terminal insulating member 1450 and the electrode terminal 1420 can also be reduced. The cap assembly 1400 according to an aspect of the present disclosure can prevent an electrical short due to the aforementioned structure. For example, as the terminal protrusion part 1423 is seated in the insulating member recess 1452 and the insulating step portion 1455 supports the terminal step portion 1428 toward the inside in the radial direction thereof, an electrical short can be prevented because the location of the electrode terminal 1420 is fixed. Furthermore, as the insulating body 1454 is pressurized between the terminal edge 1427 and the plate body 1414, an electrical short can be prevented because the location of the terminal insulating member 1450 is fixed.

The cap assembly 1400 may include the gasket 1460. The gasket 1460 may be disposed between the cap plate 1410 and the rivet part 1440. The gasket 1460 prevents an electrolyte or gas within a case (e.g., the case 1100 in FIG. 2) from leaking to the outside of the case 1100, and prevents moisture or air from penetrating from the outside of the case 1100 to the inside of the case 1100.

The gasket 1460 may include a first sealing portion 1461 and a second sealing portion 1462. The second sealing portion 1462 may be named any one of an "extension portion", a "sealing portion", or a "gasket support portion". The first sealing portion 1461 may have an elongate dimension which extends at an angle transverse to an angle at which the elongate dimension of the second sealing portion 1462 extends. In some examples, the angle may be perpendicular. The first sealing portion 1461 may have a hollow structure, and may be inserted into the through hole 1411 and disposed between the cap plate 1410 and the body part

1441 of the rivet part 1440. The throughbore formed in the hollow part of the first sealing portion 1461 may have the same central axis as the through hole 1411 and the throughbore 1440*s* of the body part 1441. The first sealing portion 1461 may have a cylindrical shape having a height in the first direction (e.g., the +Z direction). The first sealing portion 1461 may be positioned outside the body part 1441 in the radial direction thereof. The first sealing portion 1461 may be disposed between the cap plate 1410 and the body part 1441. The first sealing portion 1461 may be disposed between the insulating protrusion part 1453 and the body part 1441.

The second sealing portion 1462 may have a form of a flat plate that is bent to outwardly from the first sealing portion 1461 in the radial direction thereof. The second sealing portion 1462 may be disposed between the cap plate 1410 and the inner fastening portion 1443. The second sealing portion 1462 may be placed closer to the inner fastening portion 1443 than to the outer fastening portion 1442. The second sealing portion 1462 may be formed in an end portion of the first sealing portion 1461 toward an electrode assembly (e.g., the electrode assembly 1200 in FIG. 2).

The second sealing portion 1462 may be disposed between the cap plate 1410 and the inner fastening portion 1443. The second sealing portion 1462 may be pressurized by the cap plate 1410 and the inner fastening portion 1443.

The second sealing portion 1462 may be aligned with the base insulating member 1430 in the second direction (e.g., the +X direction). For example, the second sealing portion 1462 and the base insulating member 1430 may have the same length in the first direction (e.g., the +Z direction), and may be placed at the same height in the first direction (e.g., the +Z direction). As a result, the second sealing portion 1462 and the base insulating member 1430 may extend along a common plane extending along the planar inside surface of the cap plate 1410 in the XY-plane.

More specifically, at least a portion of the second sealing portion 1462 and at least a portion of the base insulating member 1430 may extend along a common plane. In some examples, the second sealing portion 1462 may have a thickness equal to a thickness of the base insulating member, and in such examples, an entirety of the second sealing portion 1462 may be coplanar with the base insulating member 1430.

It is also contemplated that a thickness of the second sealing portion 1462 may vary from a thickness of the base insulating member 1430. In such examples, only a portion(s) of the base insulating member 1430 may be coplanar with the second sealing portion 1462, while other portion(s) may be disposed in different (e.g., parallel) plane. The second sealing portion 1462 and the base insulating member 1430 may each have an outer (or outer-facing) surface (e.g., the surface facing upward in FIG. 11A), and may also have an inner (or inner-facing) surface opposing the outer surface (e.g., the surface facing downward in FIG. 11A). In some examples, the outer surfaces of the second sealing portion 1462 and the base insulating member 1430 may be coplanar, while the inner surfaces are disposed in different planes. In some examples, the inner surfaces of the second sealing portion 1462 and the base insulating member 1430 may be coplanar, while the outer surfaces are disposed in different planes. In some examples, but the inner and outer surfaces, respectively, of the second sealing portion 1462 and the base insulating member 1430 may be coplanar.

The second sealing portion 1462 may include a second sealing portion side 1462*c* which may face in a radially outward direction. The base insulating member 1430 may include a base side 1430*c*. The second sealing portion side 1462*c* and the base side 1430*c* may be spaced apart from each other. The second sealing portion side 1462*c* and the base side 1430*c* may face each other in the second direction (i.e., the +X direction). A space S2 may be formed between the second sealing portion side 1462*c* and the base side 1430*c*. The cap assembly 1400 according to an aspect of the present disclosure can facilitate the assembly of the gasket 1460 and the base insulating member 1430 due to the aforementioned structure. For example, as the space S2 is formed between the gasket 1460 and the base insulating member 1430, a force that is necessary for the assembly of the gasket 1460 can be reduced between friction between the gasket 1460 and the base insulating member 1430 is reduced. Furthermore, the locations of the second sealing portion 1462 and the base insulating member 1430 can be firmly fixed because the second sealing portion 1462 and the base insulating member 1430 are pressurized by the inner fastening portion 1443 in the first direction (the +Z direction) in the state in which the second sealing portion 1462 and the base insulating member 1430 have been placed at the same height. Furthermore, the cap assembly 1400 according to an aspect of the present disclosure can reduce the thickness of the cap assembly 1400 due to the aforementioned structure. For example, the second sealing portion 1462 and the base insulating member 1430 can be aligned at the same height and a thickness that is occupied by the gasket 1460 and the base insulating member 1430 can be reduced through only the process of placing the second sealing portion 1462 and the base insulating member 1430 at the same height and pressurizing the second sealing portion 1462 and the base insulating member 1430 by the inner fastening portion 1443.

The first sealing portion 1461 of the gasket 1460 may be disposed between the body part 1441 and the cap plate 1410. The first sealing portion 1461 may be pressurized by the body part 1441, and may come into contact with the cap plate 1410. The first sealing portion 1461 may include a first sealing portion side 1461*c*, which may be on a radially outer or outward facing surface of the rivet part 1440, that comes into contact with a side 1410*c* of the cap plate 1410.

The first sealing portion 1461 of the gasket 1460 may be disposed between the body part 1441 and the terminal insulating member 1450. The first sealing portion 1461 may be pressurized by the body part 1441, and may come into contact with the terminal insulating member 1450. The first sealing portion 1461 may include a first sealing portion side 1461*c* that comes into contact with a side 1450*c* of the terminal insulating member 1450.

The first sealing portion 1461 of the gasket 1460 may come into contact with the second circumference wall 1426 of the electrode terminal 1420. The first sealing portion 1461 may include a first sealing portion top 1461*a* that may face in an upward direction (e.g., away from the electrode) and comes into contact with the second circumference wall 1426 (e.g., a downward-facing or electrode-facing surface of the circumference wall 1426). The second circumference wall 1426 may have a structure in which the second circumference wall 1426 has been exposed to a through hole (e.g., the through hole 1411 in FIG. 5) of the cap plate 1410, and thus may be a portion that is vulnerable to the penetration of moisture. The cap assembly 1400 according to an aspect of the present disclosure can improve sealing performance in an area near the second circumference wall 1426 because the first sealing portion 1461 is pressurized toward the second circumference wall 1426 in the first direction (e.g., the +Z direction) by the inner fastening portion 1443 of the rivet part 1440.

The second sealing portion 1462 of the gasket 1460 may come into contact with the cap assembly 1410. The second sealing portion 1462 may be vulnerable to the penetration of moisture because the space S2 may be formed between the second sealing portion 1462 and the base insulating member 1430. The cap assembly 1400 according to an aspect of the present disclosure can improve sealing performance in an area near the space S2 because the second sealing portion 1462 is pressurized toward the cap plate 1410 in the first direction (e.g., the +Z direction) by the inner fastening portion 1443 of the rivet part 1440.

The gasket 1460 may include a material that is deformed by heat. For example, the gasket 1460 may include a rubber material. The secondary battery 1000 according to an aspect of the present disclosure can prevent damage to the gasket 1460 attributable to friction between the gasket 1460 and the base insulating member 1430 because the space S2 is formed between the gasket 1460 and the base insulating member 1430 and contact between the gasket 1460 and the base insulating member 1430 is suppressed although the gasket 1460 is expanded by the heat.

The current collection member 1300 may be inserted into the throughbore 1440*s* of the rivet part 1440 and assembled with the cap assembly 1400. The current collection protrusion 1320 may be inserted into the throughbore 1440*s*. The current collection plate 1310 may pressurize the inner fastening portion 1443 of the rivet part 1440.

The current collection plate 1310 may include a first current collection portion 1311 that comes into contact with the inner fastening portion 1443 and a second current collection portion 1312 that extends from the first current collection portion 1311. The first current collection portion 1311 may pressurize the inner fastening portion 1443 toward the second sealing portion 1462 of the gasket 1460. The first current collection portion 1311 may pressurize the inner fastening portion 1443 toward the base insulating member 1430. The second current collection portion 1312 may be spaced apart from the base insulating member 1430. A space S3 may be formed between the second current collection portion 1312 and the base insulating member 1430. In the secondary battery 1000 according to an aspect of the present disclosure, sealing performance of the cap assembly 1400 can be improved because the current collection protrusion 1320 is inserted into the throughbore 1440*s*, the current collection member 1300 is assembled with the cap assembly 1400, and the current collection plate 1310 also pressurizes the inner fastening portion 1443 in the first direction (e.g., the +Z direction). For example, the inner fastening portion 1443 may include a first pressurization portion 14431 that comes into contact with an end portion 1430*a* of the base insulating member 1430 and a second pressurization portion 14432 that comes into contact with the second sealing portion 1462 of the gasket 1460. As the current collection protrusion 1432 is inserted into the throughbore 1440*s*, the first and second pressurization portions 14431 and 14432 may be pushed out in the first direction (i.e., the +Z direction) along with the current collection plate 1310. Accordingly, sealing performance in an area near the gasket 1460 can be improved because the base insulating member 1430 is pressurized between the cap plate 1410 and the first pressurization portion 14431 and the second sealing portion 1462 is pressurized between the cap plate 1410 and the second pressurization portion 14432.

The inner fastening portion 1443 of the rivet part 1440 is extended until the inner fastening portion 1443 comes into contact with the base insulating member 1430 after traversing laterally (in the XY-plane) along and past the second sealing portion 1462 of the gasket 1460 (i.e., beyond the second sealing portion side 1462*c* of the second sealing portion 1462). In this case, airtightness is maintained because the inner fastening portion 1443 becomes close to the base insulating member 1430 and the second sealing portion 1462 only when the thickness of the second sealing portion 1462 in the first direction (e.g., the +Z direction) is the same as the thickness of the base insulating member 1430 in the first direction (e.g., the +Z direction).

The radius of the insertion hole 1421 may be smaller than the radius of the through hole 1411. Accordingly, the bottom of the electrode terminal 1420 may be exposed by the through hole 1411 around the insertion hole 1421. The top 1461*a* of the first sealing portion 1461 of the gasket 1460 may come into contact with the second circumference wall 1426 that is exposed by the through hole 1411 of the electrode terminal 1420. Accordingly, the sealing effect of the gasket 1460 may be increased.

The gasket 1460 may include a groove 1463 that is formed at a bent portion at which the first sealing portion 1461 and the second sealing portion 1462 come into contact with each other. The groove 1463 may be continuously formed along the circumference of the first sealing portion 1461. The cap plate 1410 may include a hole protrusion part 1413 that is formed at the bottom of the through hole 1411. The hole protrusion part 1413 may be inserted into the groove 1463. The hole protrusion part 1413 may be formed to have a shape corresponding to a shape of the groove 1463. When the hole protrusion part 1413 is inserted into the groove 1463, the gasket 1460 and the cap plate 1410 are closely fit together or interlocked, thus improving sealing power of the gasket 1460.

The inner fastening portion 1443 of the rivet part 1440 may include a rivet protrusion 1444 that is formed in a direction toward the cap plate 1410. The number of rivet protrusions 1444 may be plural. A fastening groove 1464 may be formed in the gasket 1460 in accordance with the rivet protrusion 1444 such that the fastening groove 1464 is sized and positioned to accommodate the rivet protrusion 1444 therein. The rivet protrusion 1444 may be inserted into the fastening groove 1464. In another aspect, the fastening groove 1464 may be formed in at least any one of the base insulating member 1430 or the gasket 1460. The number of fastening grooves 1464 may be the same as the number of rivet protrusions 1444. The rivet part 1440 can be stably fixed through the combination of the rivet protrusion 1440 and the fastening groove 1464.

The current collection member 1300 may be assembled with the cap assembly 1400. The combination of the assembly 1400 and the current collection member 1300 may be performed as the current collection protrusion 1320 is inserted into the throughbore 1440*s* formed in the body part 1441 of the rivet part 1440. To this end, the external diameter of the current collection protrusion 1320 may be identical with or slightly greater than the internal diameter of the throughbore 1440*s* of the body part 1441. When the cap assembly 1400 and the current collection member 1300 are assembled, the current collection plate 1310 may come into contact with the inner fastening portion 1443 of the rivet part 1440.

After the cap assembly 1400 and the current collection member 1300 are assembled or coupled together, the current collection protrusion 1320 and the outer fastening portion

1442 of the rivet part 1440 may be welded together. More specifically, the current collection protrusion 1320 and the outer fastening portion 1442 may be welded together along the outer circumference of the top of the current collection protrusion 1320 by a method, such as ultrasonic welding or laser welding. For clean and continuous welding, the outer circumference of the current collection protrusion 1320 and the inside of the outer fastening portion 1442 may be subjected to round processing or deodorization treatment.

When the current collection protrusion 1320 is inserted into the throughbore 1440*s* formed in the body part 1441 of the rivet part 1440, the top of the current collection protrusion 1320 may be placed at the same height as the outer fastening portion 1442 of the rivet part 1440. The outer fastening portion 1442 may be spaced apart from the top of the electrode terminal 1420. The top of the current collection protrusion 1320 may be spaced apart from the top of the electrode terminal 1420. Accordingly, a welded welding part W does not reach the outside of the electrode terminal 1420.

The current collection plate 1310 of the current collection member 1300 may be bonded to an electrode tab (e.g., the electrode tabs 1220 and 1230 in FIG. 3) of an electrode assembly (e.g., the electrode assembly 1200 in FIG. 2). The current collection protrusion 1320 that is formed by protruding from one surface of the current collection plate 1310 is connected to the electrode terminal 1420 through the rivet part 1440. Accordingly, the electrode assembly 1200 is electrically connected to the electrode terminal 1420.

Figure 13A:
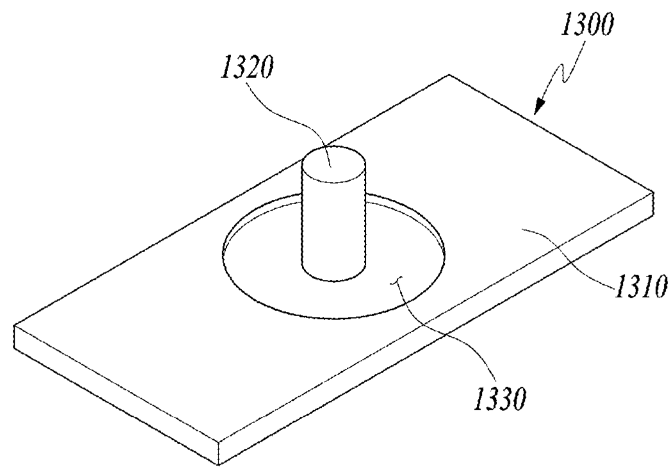
FIG. 13A is a perspective view of a current collection member according to an aspect of the present disclosure.

As illustrated in FIG. 13A, in the current collection member 1300 according to another aspect of the present disclosure, a first fixing groove 1330 may be formed in a top surface of the current collection plate 1310. The first fixing groove 1330 may be formed in the circumference of the current collection protrusion 1320 centering around the current collection protrusion 1320. When the cap assembly 1400 and the current collection member 1300 are assembled, the inner fastening portion 1443 of the rivet part 1440 may be accommodated and seated in the first fixing groove 1330. Accordingly, the current collection member 1300 and the rivet part 1440 are stably coupled.

Figure 14:
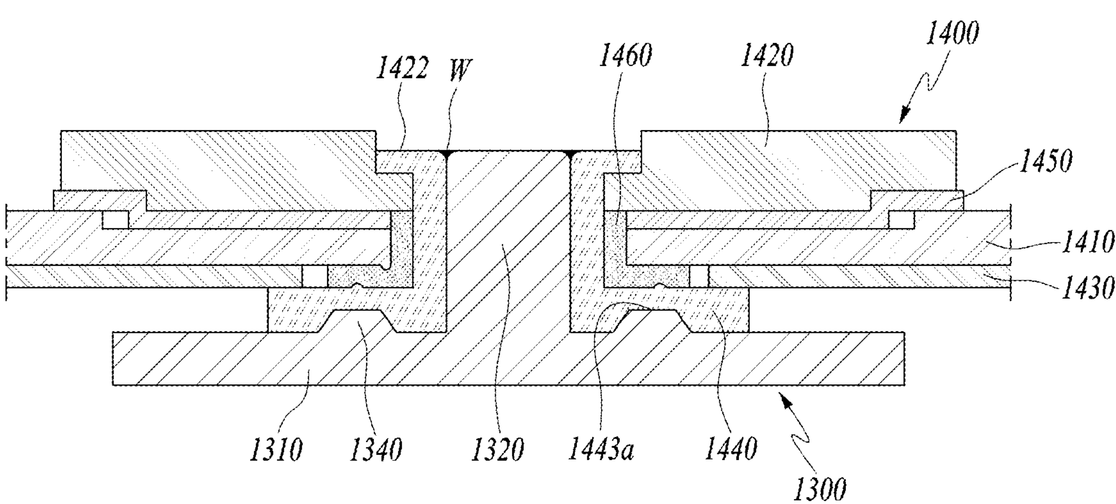
FIG. 14 is a cross-sectional elevation view illustrating the inner fastening portion of the rivet part and the current collection plate combined according to another aspect of the present disclosure.

As illustrated in FIG. 14, in the current collection member 1300 according to still another aspect of the present disclosure, a fixing protrusion 1340 may be formed in the top surface of the current collection plate 1310. A second fixing groove 1443*a* into which the fixing protrusion 1340 is inserted may be formed in the inner fastening portion 1443 of the rivet part 1440. As the fixing protrusion 1340 is inserted into the second fixing groove 1443*a*, the current collection member 1300 and the rivet part 1440 are stably coupled.

Figure 13B:
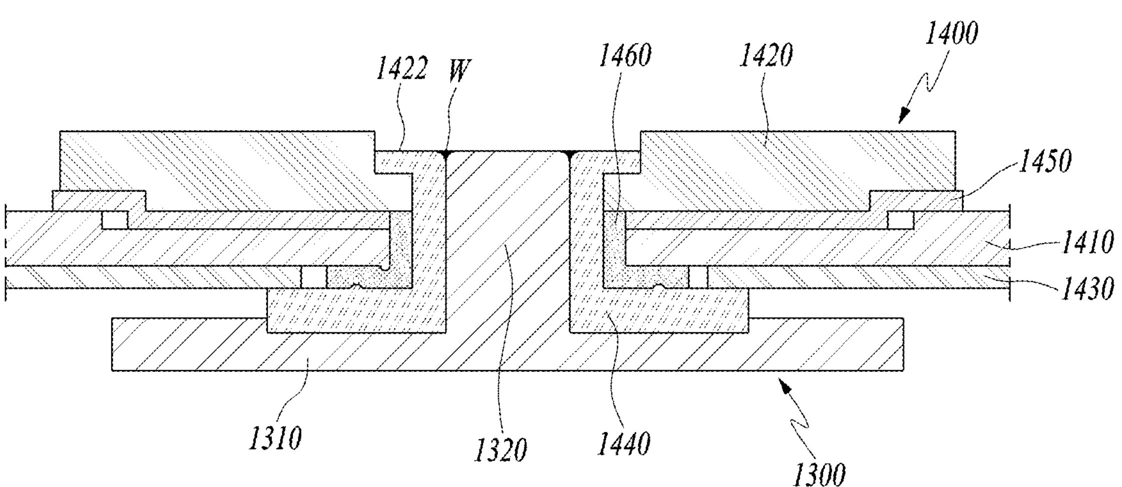
FIG. 13B is a cross-sectional elevation view illustrating the inner fastening portion of the rivet part seated in a current collection plate in which a first fixing groove is defined according to another aspect of the present disclosure.

When the current collection member 1300 and the rivet part 1440 are stably coupled in the same method as that described with reference to FIGS. 13A, 13B, and 14, the concentricities of the current collection protrusion 1340 and the throughbore of the main body part 1441 of the rivet part 1440 can be easily aligned. Furthermore, the top of the current collection protrusion 1340 and the height of the outer fastening portion 1442 of the rivet part 1440 can be easily aligned. Accordingly, the assembly of the cap assembly 1400 can be improved.

Figure 15A:
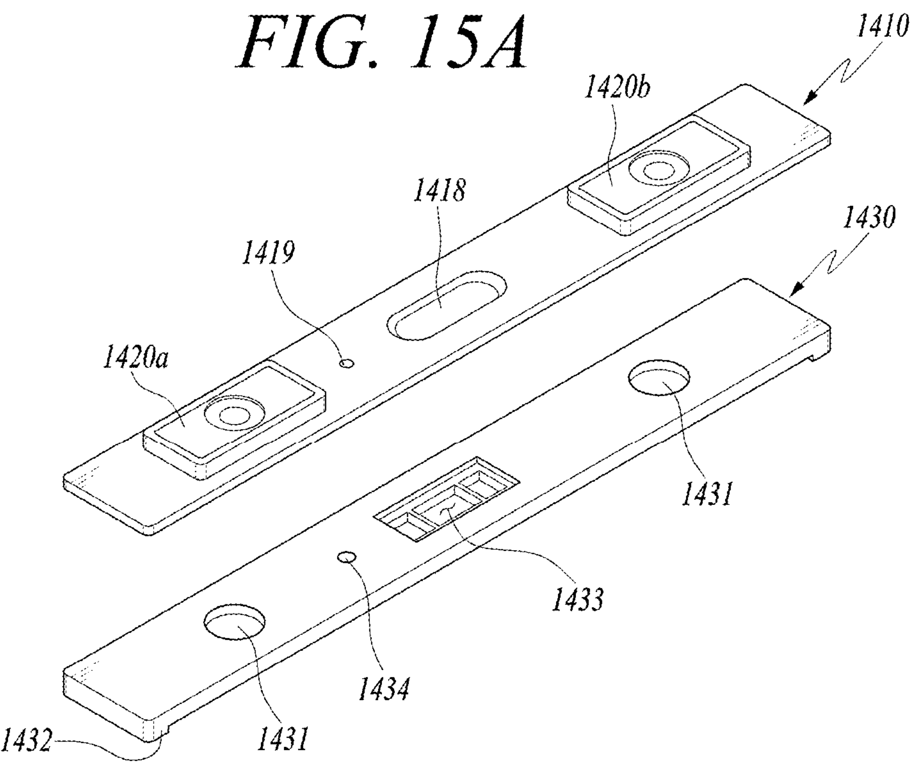
FIG. 15A is an exploded perspective view illustrating the cap plate and a base insulating member according to an aspect of the present disclosure.
Figure 15B:
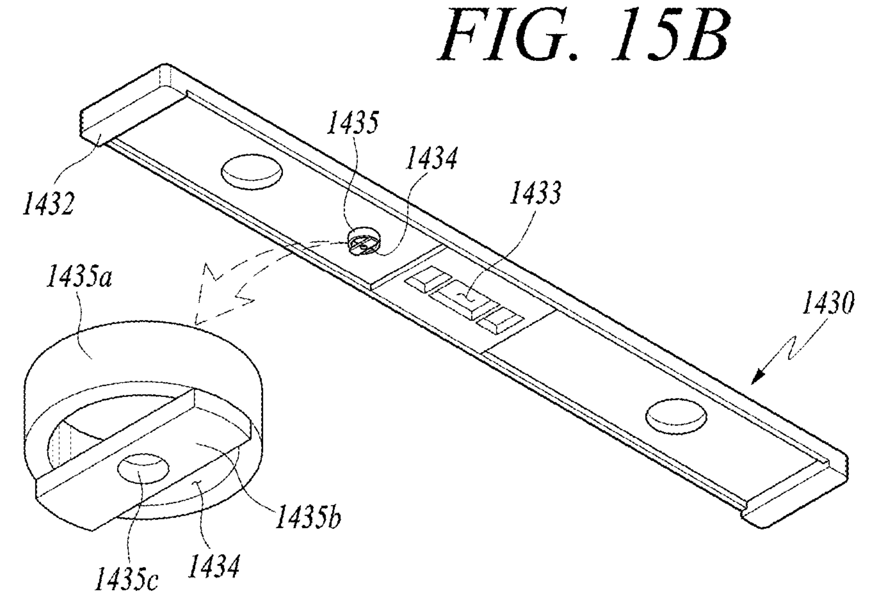
FIG. 15B is a perspective view illustrating the bottom of the base insulating member along with an enlarged view of an associated guide part according to the aspect of FIG. 15A.
Figure 16:
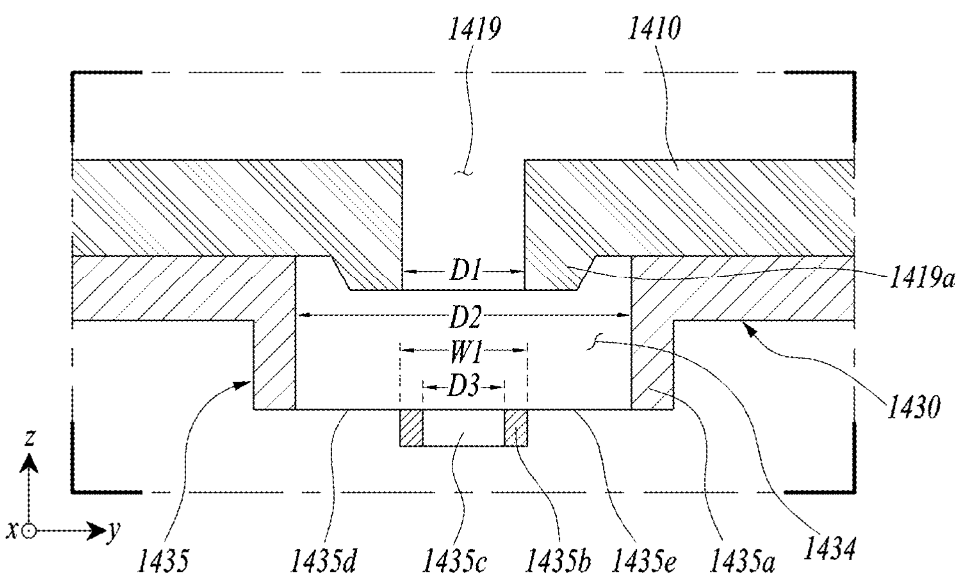
FIG. 16 is a cross-sectional elevation view illustrating the electrolyte inlet of the cap plate and the guide hole of the base insulating member according to an aspect of the present disclosure.

As illustrated in FIGS. 15A-B and 16, the cap plate 1410 and the base insulating member 1430 may each have a quadrangle plate shape. Two support protrusions 1432 that protrude in a direction opposite the location of the cap plate 1410 may be formed at both ends of the base insulating member 1430. The vent part 1418 and the electrolyte inlet 1419 are formed in the cap plate 1410. An exhaust hole 1433 and a guide hole 1434 are formed in the base insulating member 1430.

The exhaust hole 1433 is disposed under the vent part 1418, and includes a plurality of exhaust openings. If the exhaust hole 1433 is formed in the base insulating member 1430 as described above, when pressure within the case 1100 is increased, the vent part 1418 may be broken at preset reference or threshold pressure, and thus a gas within the case 1100 can be easily discharged to the outside.

The guide hole 1434 is disposed under the electrolyte inlet 1419. An injection protrusion 1419*a* is formed at the bottom of the electrolyte inlet 1419 and inserted into an upper part of the guide hole 1434. A guide part 1435 is formed in the guide hole 1434 in a direction toward the electrode assembly. The guide part 1435 may include a guide rim 1435*a* that surrounds a lower part of the guide hole 1434, a support 1435*b* that is disposed in the lower part of the guide hole 1434 and that partially blocks the guide hole 1434, and an internal hole 1435*c* that is formed in the support 1435*b* and that moves a fluid. The guide rim 1435*a* may have a circular ring form. The support 1435*b* may have a straight rod shape. The support 1435*b* is fixed to the bottom of the guide rim 1435*a*, and may be connected in the direction of the diameter of the guide hole 1434. The internal hole 1435*c* is disposed at the center of the support 1435*b* in the length direction thereof, and may be formed to face the electrolyte inlet 1419. The diameter D3 of the internal hole 1435*c* is smaller than the diameter D1 of the electrolyte inlet 1419. The internal hole 1435*c* may be disposed within a lower area corresponding to the electrolyte inlet 1419.

The diameter D2 of the guide hole 1434 may be greater than the diameter D1 of the electrolyte inlet 1419. The width W1 of the support 1435*b* may be 0.2 to 0.6 times the diameter D2 of the guide hole 1434. In this case, the width W1 of the support 1435*b* may be greater than the diameter D1 of the electrolyte inlet 1419 and may be 1.1 to 1.5 times the diameter D1 of the electrolyte inlet 1419.

When the guide part 1435 is formed in the base insulating member 1430, the electrolyte inlet 1419 can be prevented from being clogged and an electrolyte can be easily injected by the lower structure. In particular, an electrolyte that moves into the case 1100 through the internal hole 1435*c* can be prevented from flowing backward because the internal hole 1435*c* is disposed directly below the electrolyte inlet 1419. Furthermore, if the internal hole 1435*c* is clogged or a large amount of an electrolyte is supplied, the electrolyte can be injected into the case 1100 through a first opening 1435*d* and a second opening 1435*e* formed on both sides of the support 1435*b*.

Figure 17:
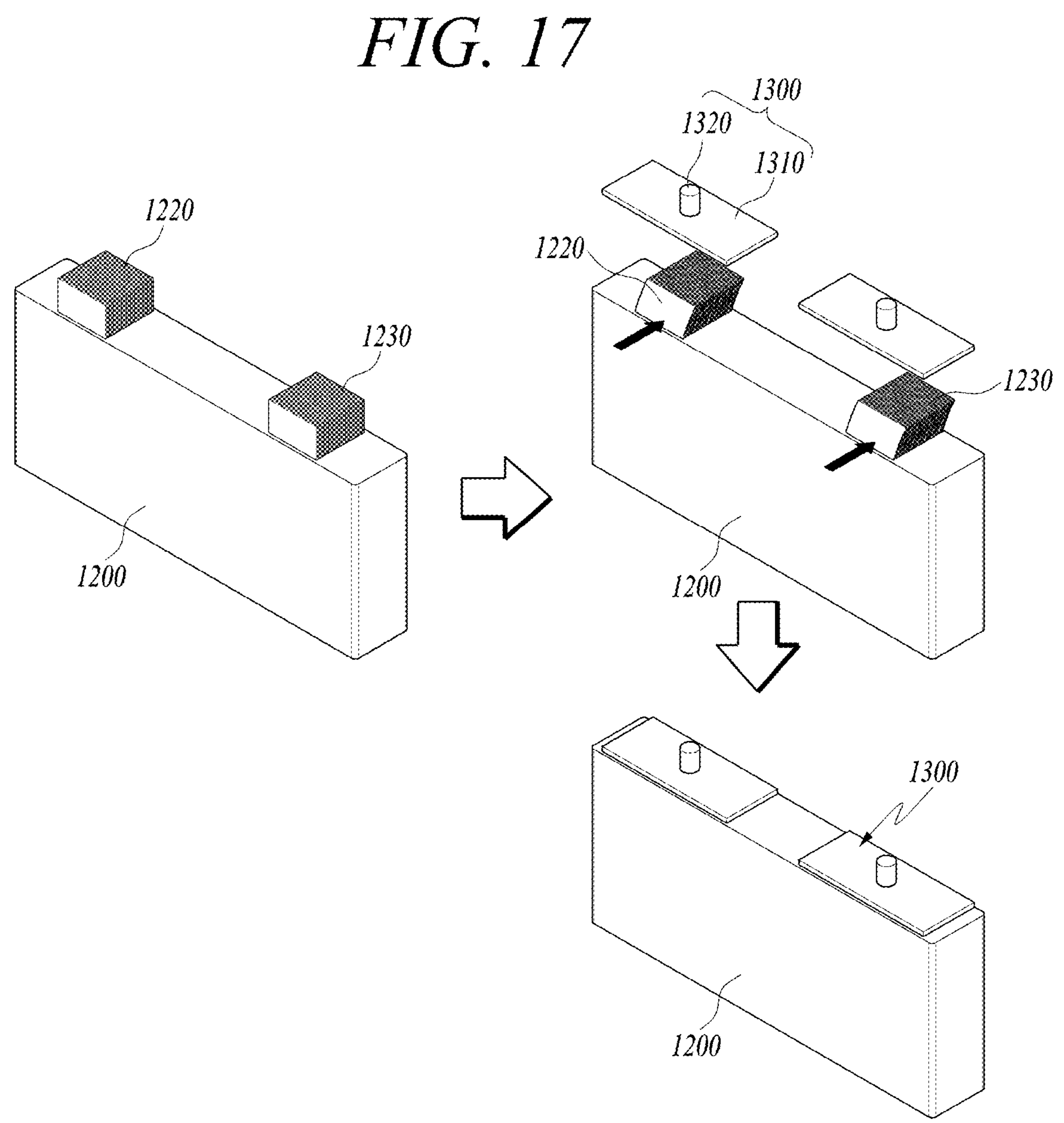
FIG. 17 is sequential perspective views illustrating a process of coupling the electrode tabs and a current collection member in the secondary battery according to an aspect of the present disclosure.
Figure 18:
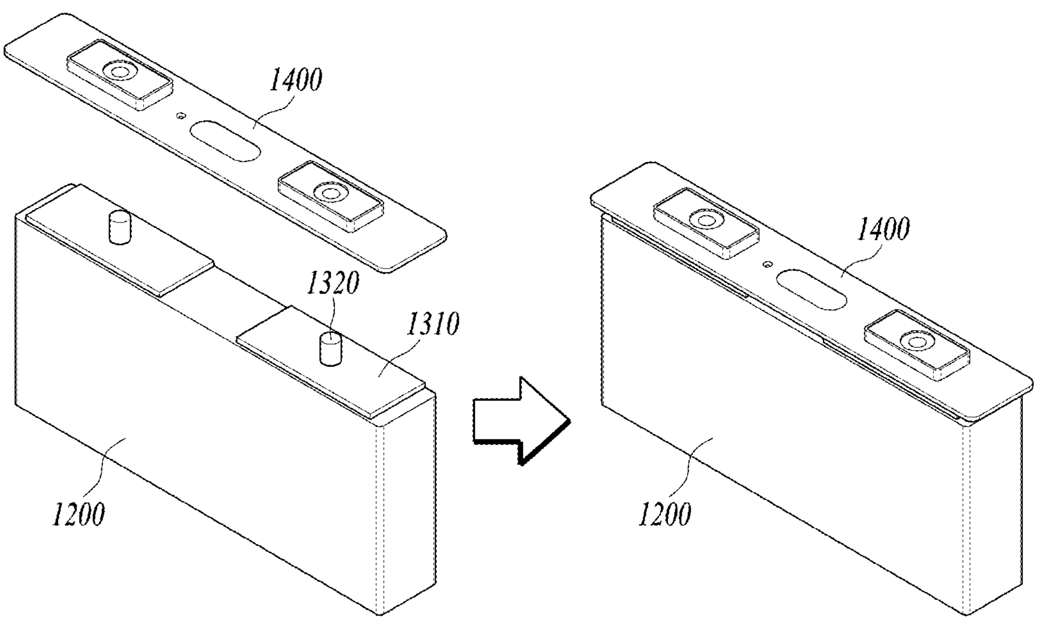
FIG. 18 is sequential perspective views illustrating a process of coupling the cap assembly and the current collection member in the secondary battery according to an aspect of the present disclosure.

As illustrated in FIGS. 17 and 18, in the secondary battery 1000 according to an aspect of the present disclosure, the electrode tabs 1220 and 1230 of the electrode assembly 1200 and the current collection member 1300 are welded together. To this end, the first electrode tabs 1220 are welded together, and the second electrode tabs 1230 are welded together. In the state in which the electrode tabs 1220, 1230 that are welded together have been bent by applying a force to the electrode tabs in the bending direction thereof, the current collection member 1300 is disposed over the electrode tabs 1220, 1230. The electrode tabs 1220, 1230 and the current collection plate 1310 are bonded by welding the electrode tabs 1220, 1230 and the current collection plate 1310 together over the current collection plate 1310 of the current collection member 1300.

When the electrode tabs 1220, 1230 and the current collection member 1300 are welded together, the electrode assembly 1200 is accommodated in the case 1100. An opening is formed in one surface of the case 1100. The current collection protrusion 1310 is exposed to the outside through the opening. The cap assembly 1400 is coupled with the case 1100. The cap assembly 1400 is coupled with the case 1100 so that the current collection protrusion 1310 of the current collection plate 1300 is inserted into the throughbore of the rivet part.

Figure 20:
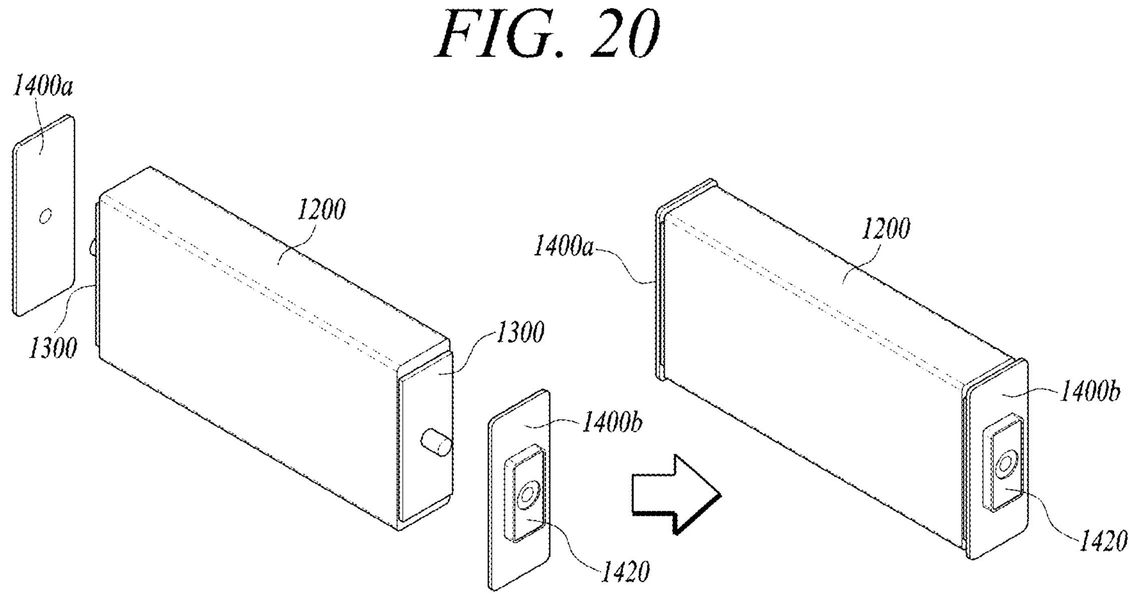
FIG. 20 is sequential perspective views illustrating a process of coupling the cap assembly with the current collection member in the secondary battery according to another aspect of the present disclosure.

As illustrated in FIGS. 19 and 20, in the secondary battery according to another aspect of the present disclosure, the first electrode tab 1220 and the second electrode tab 1230 are disposed on different sides of the electrode assembly 1200 (e.g., opposing ends of the electrode assembly 1200). That is, the first electrode tab 1220 is formed extending from the electrode assembly 1200 in a first direction, and the second electrode tab 1230 is formed extending from the electrode assembly 1200 in a second direction opposite the first direction. A first current collection member 1300*a* is disposed on the first electrode tab 1220. A second current collection member 1300*b* is disposed on the second electrode tab 1230. Accordingly, the current collection plate 1310 is disposed on the electrode tabs 1220, 1230. The electrode tabs 1220, 1230 and the current collection plate 1310 are welded together.

When the electrode tabs 1220 and 1230 and the current collection member 1300 are welded together, the electrode assembly 1200 is accommodated in the case 1100. A first opening and a second opening are formed in one surface and an opposing surface of the case 1100, respectively. The current collection protrusion 1310 of the current collection member 1300 that has been bonded to the electrode tabs 1220 and 1230 are exposed to the outside through the openings, respectively. As the current collection protrusion 1310 of the current collection plate 1300 is inserted into the throughbore of the fastening part, the cap assembly 1400 is combined with the openings of the case 1100 by being secured to the case 1100 so as to cover the openings. That is, a first cap assembly 1400*a* may cover a first opening, and a second cap assembly 1400*b* may cover a second opening.

Figure 21:
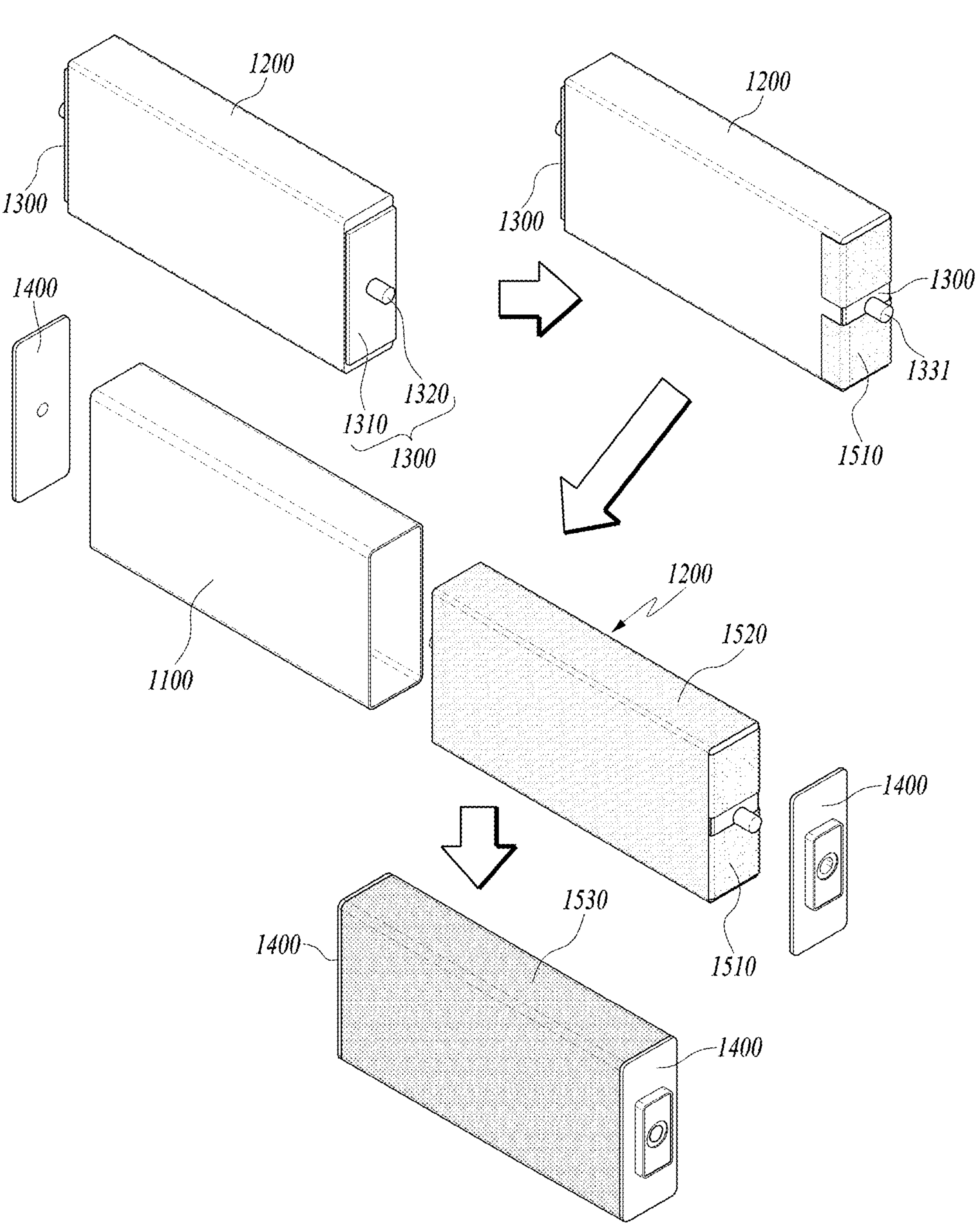
FIG. 21 is sequential perspective views illustrating attachment of an insulating tab and coupling the cap assembly with the electrode assembly according to an aspect of the present disclosure.

As illustrated in FIG. 21, in the secondary battery 1000 according to an aspect of the present disclosure, the two current collection members 1300 are bonded to the electrode tabs on different sides of the electrode assembly 1200. After the electrode assembly 1200 and the current collection member 1300 are bonded, a first insulating tab 1510 may be attached to the current collection member 1300. The first insulating tab 1510 covers the current collection plate 1310 on both sides of the current collection protrusion 1320, and may be extended up to the electrode assembly 1200 and attached thereto. The current collection member 1300 can be stably fixed through the first insulating tab 1300, thus preventing a short-circuit between the electrode tab and the cap assembly 1400.

After the first insulating tab 1510 is attached, the entire surface that belongs to an external surface of the electrode assembly 1200 and in which an electrode tab has not been formed is surrounded by the second insulating tab 1520. Thereafter, the electrode assembly 1200 is inserted into the case 1100. The case 1100 and the electrode assembly 1200 are insulated by the second insulating tab 1520.

After the electrode assembly 1200 is inserted into the case 1100, the cap assembly 1400 is secured to the case 1100 at the opening of the case 1100. An external surface of the case 1100 is surrounded by the third insulating tab 1530, thereby completing the fabrication of the secondary battery.

Figure 23:
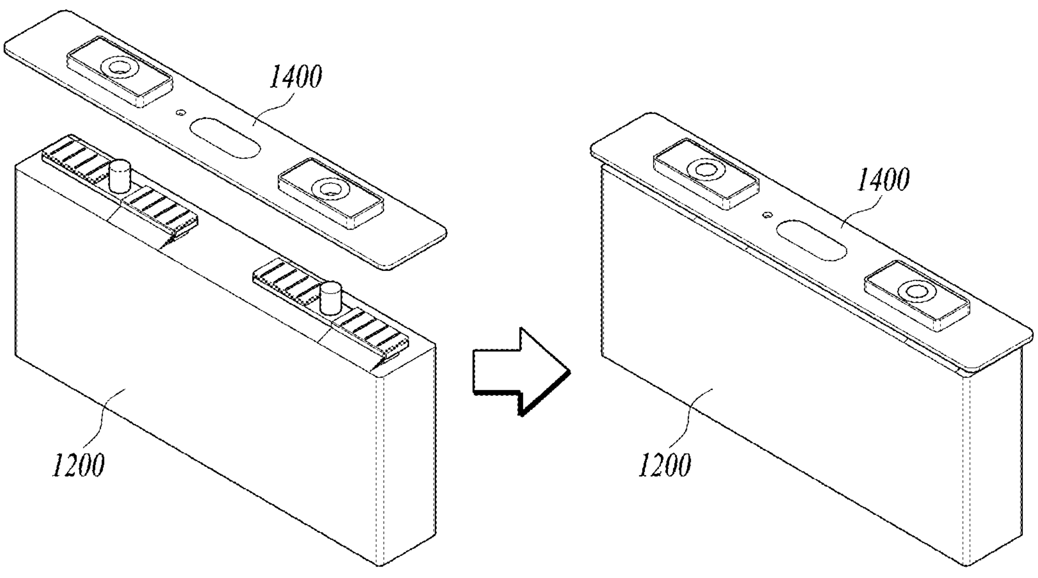
FIG. 23 is sequential perspective views illustrating a process of the cap assembly being coupled with the current collection member in the secondary battery according to another aspect of the present disclosure.

As illustrated in FIGS. 22 and 23, the electrode assembly 1200 of the secondary battery 1000 according to an aspect of the present disclosure includes a plurality of (1-1)-th electrode tabs 1220*a*, a plurality of (1-2)-th electrode tabs 1220*b*, a plurality of (2-1)-th electrode tabs 1230*a*, and a plurality of (2-2)-th electrode tabs 1230*b*. The plurality of (1-1)-th electrode tabs 1220*a* are aligned and overlapped. The plurality of (1-2)-th electrode tabs 1220*b* are aligned and overlapped. The plurality of (2-1)-th electrode tabs 1230*a* are aligned and overlapped. The plurality of (2-2)-th electrode tabs 1230*b* are aligned and overlapped. The plurality of electrode tabs 1220*a* to 1230*b* are disposed in the width direction and length direction of the electrode assembly 1200 so that each of the plurality of electrode tabs 1220*a* to 1230*b* does not overlap. Each of the plurality of electrode tabs 1220*a* to 1230*b* that overlap at respective locations is welded together.

The current collection member 1300 is disposed between the (1-1)-th electrode tabs 1220*a* and the (1-2)-th electrode tabs 1220*b*. A current collection insulation member may be disposed between the current collection member 1300 and the electrode assembly 1200. The (1-1)-th electrode tabs 1220*a* are bent upward from the current collection plate 1310 on one side of the current collection protrusion 1320. The (1-2)-th electrode tabs 1220*b* are bent upward from the current collection plate 1310 on the other side of the current collection protrusion 1320. A current collection member 1300 is also disposed between the (2-1)-th electrode tabs 1230*a* and the (2-2)-th electrode tabs 1230*b*. The (2-1)-th electrode tabs 1230*a* are bent upward from the current collection plate 1310 on one side of the current collection protrusion 1320. The (2-2)-th electrode tabs 1230*b* are bent upward from the current collection plate 1310 on the other side of the current collection protrusion 1320.

When the plurality of electrode tabs 1220*a* to 1230*b* is bent upward from the current collection plate 1310, the plurality of electrode tabs 1220*a* to 1230*b* and the current collection plate 1310 are bonded by welding the plurality of electrode tabs 1220*a* to 1230*b* and the current collection plate 1310 together over the plurality of electrode tabs 1220*a* to 1230*b*. A method of welding, such as ultrasonic welding or laser welding, may be used.

When the plurality of electrode tabs 1220*a* to 1230*b* and the current collection member 1300 are bonded, the electrode assembly 1200 is accommodated in the case 1100. An opening is formed in one surface of the case 1100. The current collection protrusion 1310 is exposed to the outside through the opening. The cap assembly 1400 is coupled to the case 1100. The current collection protrusion 1310 of the current collection plate 1300 is inserted into the throughbore of the rivet part.

Figure 24:
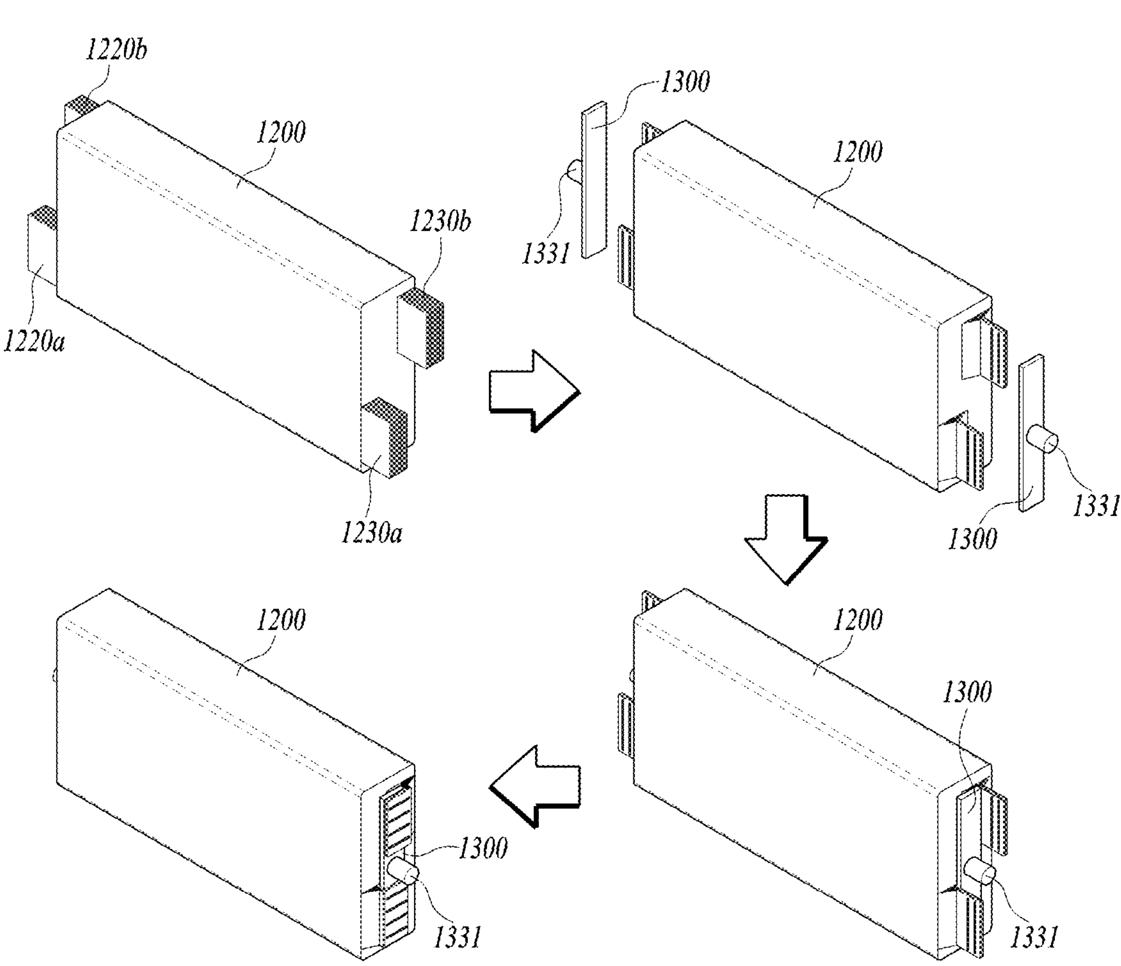
FIG. 24 is sequential perspective views illustrating electrode tabs formed in both directions of the electrode assembly bonded to associated current collection members in the secondary battery according to another aspect of the present disclosure.
Figure 25:
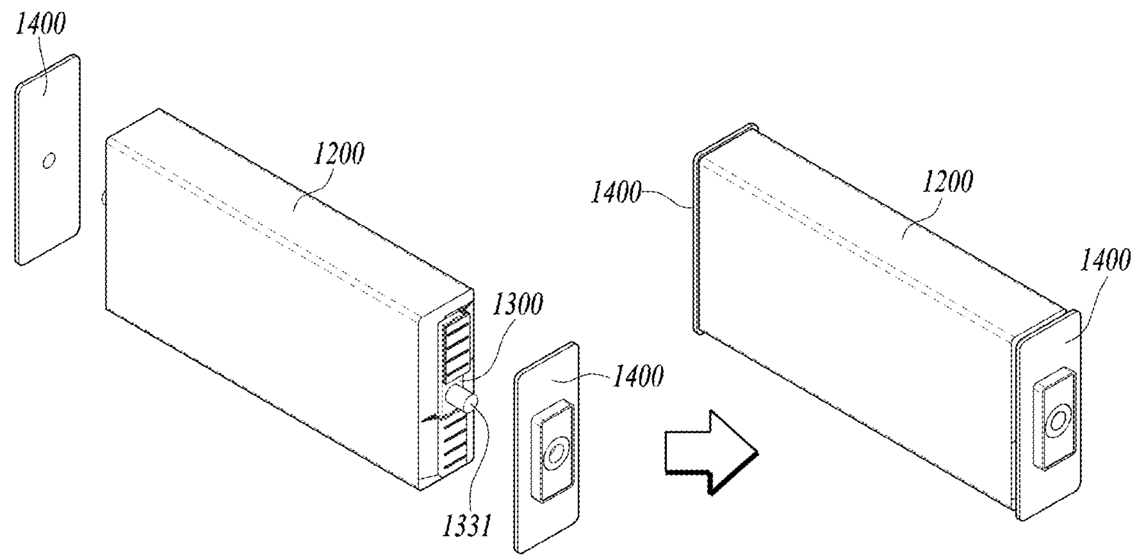
FIG. 25 is sequential perspective views illustrating a process of the cap assembly being coupled with the current collection member in the secondary battery according to another aspect of the present disclosure.

As illustrated in FIGS. 24 and 25, the electrode assembly 1200 of the secondary battery 1000 according to an aspect of the present disclosure includes the plurality of (1-1)-th electrode tabs 1220*a*, the plurality of (1-2)-th electrode tabs 1220*b*, the plurality of (2-1)-th electrode tabs 1230*a*, and the plurality of (2-2)-th electrode tabs 1230*b*. In the present aspect, a detailed description of the same contents as those described with reference to FIGS. 22 and 23 is omitted.

The (1-1)-th electrode tabs 1220*a* and the (1-2)-th electrode tabs 1220*b* are disposed on one side of the electrode assembly 1200. The (2-1)-th electrode tabs 1230*a* and the (2-2)-th electrode tabs 1230*b* are disposed on the other side of the electrode assembly 1200. The current collection member 1300 is disposed between the (1-1)-th electrode tabs 1220*a* and the (1-2)-th electrode tabs 1220*b* and between the (2-1)-th electrode tabs 1230*a* and the (2-2)-th electrode tabs 1230*b*. When each of the plurality of electrode tabs 1220*a* to 1230*b* is bent upward from the current collection plate 1310, the plurality of electrode tabs 1220*a* to 1230*b* and the current collection plate 1310 are bonded by welding the plurality of electrode tabs 1220*a* to 1230*b* and the current collection plate 1310 together over the plurality of electrode tabs 1220*a* to 1230*b*.

When the plurality of electrode tabs 1220*a* to 1230*b* and the current collection member 1300 are bonded, the electrode assembly 1200 is accommodated in the case 1100. Openings are formed in one surface and the other surface of the case 1100, respectively. The current collection protrusion 1310 is exposed to the outside through the opening. The cap assembly 1400 is coupled to the case 1100. The current collection protrusion 1310 of the current collection plate 1300 is inserted into the throughbore of the rivet part of the cap assembly 1400.

Figure 26:
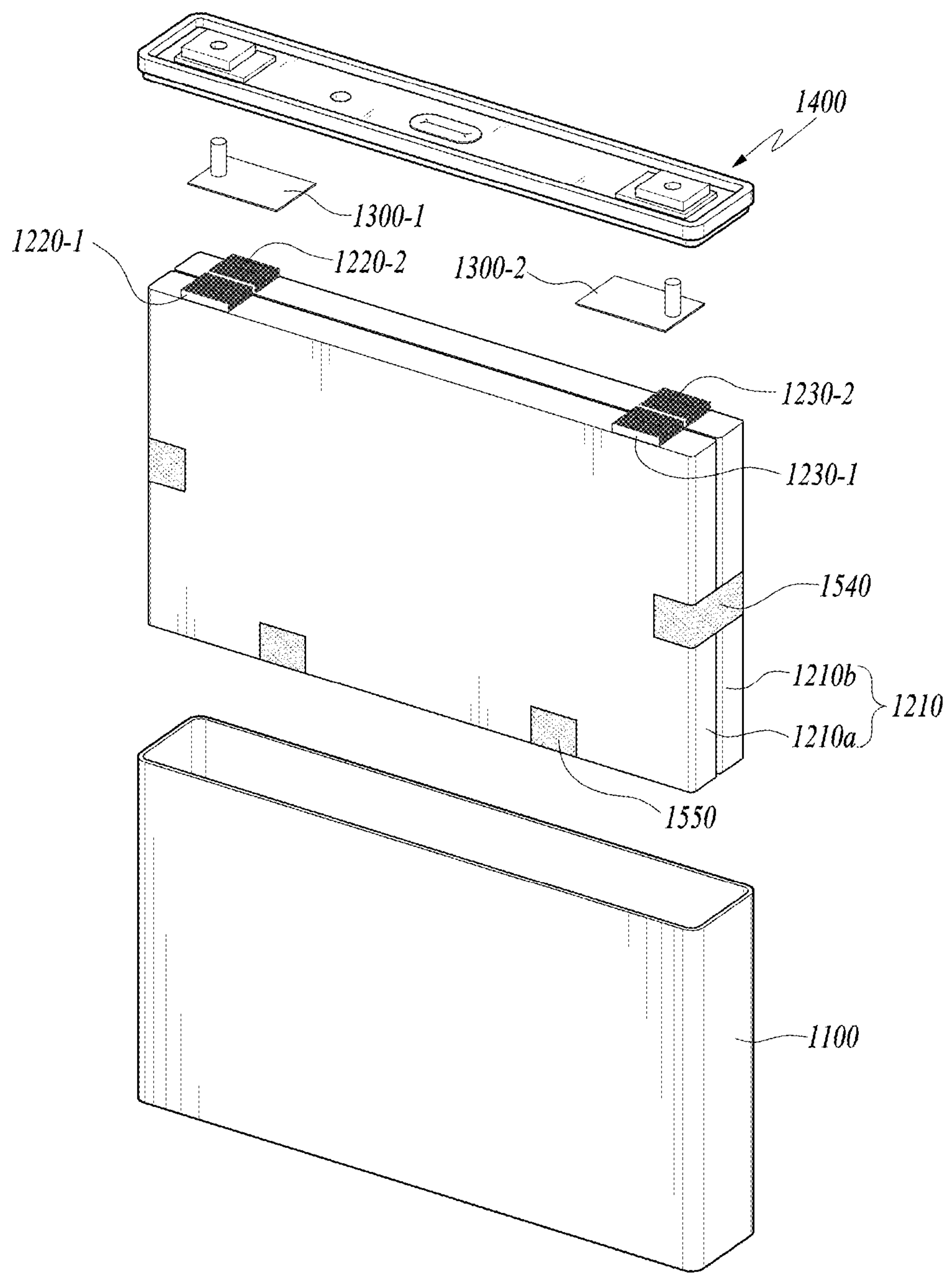
FIG. 26 is an exploded perspective view illustrating a secondary battery including two electrode parts according to another aspect of the present disclosure.
Figure 27:
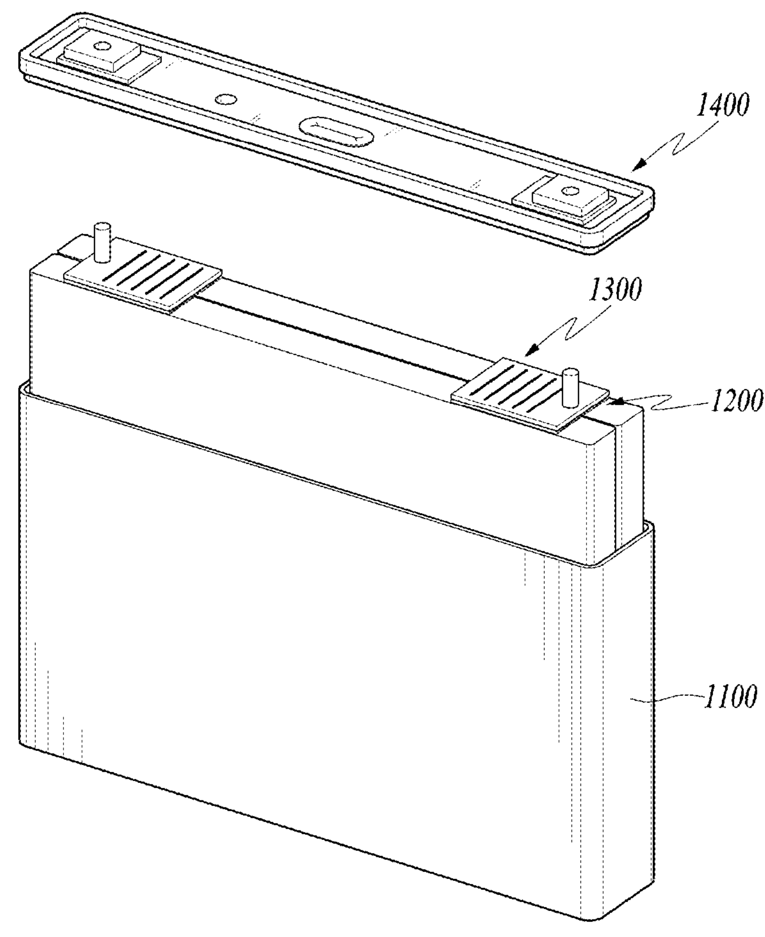
FIG. 27 is an exploded perspective view illustrating electrode tabs formed in the two electrode parts of the aspect of FIG. 26 bonded to an electrode member.

As illustrated in FIGS. 26 and 27, the secondary battery 1000 according to another aspect of the present disclosure includes the case 1100, the electrode assembly 1200, the current collection member 1300, and the cap assembly 1400. In the present aspect, a detailed description of the same contents as those described with reference to FIGS. 1 to 25 is omitted.

The electrode part 1210 of the electrode assembly 1200 includes a first electrode part 1210*a* and a second electrode part 1210*b*. The first electrode part 1210*a* includes one or more first electrode tabs 1220-1 and one or more second electrode tabs 1230-1. The second electrode part 1210*b* includes one or more first electrode tabs 1220-2 and one or more second electrode tabs 1230-2. The first electrode tabs 1220-1 of the first electrode part 1210*a* and the first electrode tabs 1220-2 of the second electrode part 1210*b* are bonded to the same current collection member 1300*a*. The second electrode tabs 1230-1 of the first electrode part 1210*a* and the second electrode tabs 1230-2 of the second electrode part 1210*b* are bonded to the same current collection member 1300*b*.

In the present aspect, the first electrode part 1210*a* and the second electrode part 1210*b* are combined by being taped together by a fourth insulating tab 1540 and a fifth insulating tab 1550. The fourth insulating tab 1540 is attached to the side of the electrode assembly 1200 in the height direction thereof. The fifth insulating tab 1550 is attached to the side of the electrode assembly 1200 in the length direction thereof.

When N fourth and fifth insulating tabs 1540 and 1550 are attached to one surface of the electrode assembly 1200, each of the fourth and fifth insulating tabs 1540 and 1550 may be attached to a point by which the length of the surface to which the fourth and fifth insulating tabs 1540 and 1550 are attached is divided by (n+1). For example, as illustrated in FIG. 26, when one fourth insulating tab 1540 is attached to one side of the electrode assembly 1200 in the height direction thereof, the fourth insulating tab 1540 is attached to a point by which the side of the electrode assembly 1200 in the height direction is divided into two. When two fifth insulating tabs 1550 are attached to one side of the electrode assembly 1200 in the length direction thereof, the fifth insulating tab 1550 is attached to two points by which the side of the electrode assembly 1200 in the length direction is divided into three. In the present aspect, the number of fourth insulating tabs 1540 has been illustrated as being one and the number of fifth insulating tabs 1550 has been illustrated as being two, but the present disclosure is not limited thereto. The fourth insulating tab 1540 and the fifth insulating tab 1550 can function to bind the first electrode part 1210*a* and the second electrode part 1210*b* and to also insulate the first electrode part 1210*a* and the second electrode part 1210*b*.

After the electrode assembly 1200 is taped by the fourth and fifth insulating tabs 1540 and 1550, a sixth insulating tab (not shown) may be attached to the electrode assembly 1200 so that the sixth insulating tab surrounds all of the remaining surfaces of the electrode assembly 1200, except a side on which the electrode tabs 1220-1, 1220-2, 1230-1, and 1230-2 are formed, for insulation between the electrode assembly 1200 and the case 1100. Thereafter, the electrode assembly 1200 is inserted into the case 1100. The cap assembly 1400 is secured to the case 1100 so as to cover the opening of the case 1100.

Although the aspects of the present disclosure have been described above, a person who has ordinary knowledge in the art may variously modify and change the present disclosure by supplementing, changing, deleting, or adding a component without departing from the spirit of the present disclosure written in the claims. All of such aspects may be said to belong to the scope of rights of the present disclosure.

DESCRIPTION OF REFERENCE NUMERALS

1000: secondary battery
1100: case
1200: electrode assembly
1300: current collection member
1400: cap assembly
1410: cap plate
1420: electrode terminal
1430: base insulating member
1440: rivet part
1450: terminal insulating member
1460: gasket

What is claimed is:

1. A secondary battery comprising:

an electrode assembly;

a case having the electrode assembly received therein; and a cap assembly coupled to the case and covering an opening of the case, wherein the cap assembly comprises:

a cap plate comprising a through hole;

a rivet part comprising a body part and an inner fastening portion, the body part positioned in the through hole and extending toward an outside of the case, and the inner fastening portion extending from the body part between the cap plate and the electrode assembly;

a base insulating member disposed between the cap plate and the electrode assembly; and a gasket disposed between the cap plate and the rivet part;

a current collection plate; and a current collection protrusion protruding from the current collection plate and positioned within a throughbore defined in the body part, wherein at least a part of the base insulating member and at least a part of the gasket contact the inner fastening portion and extend parallel to each other between the cap plate and the inner fastening portion.

2. The secondary battery of claim 1, wherein:

the cap plate, the inner fastening portion of the rivet part, the base insulating member, and the gasket are stacked in layers of the cap assembly, and the at least a part of the base insulating member and the at least a part of the gasket are disposed within a same layer of the cap assembly.

3. The secondary battery of claim 2, wherein the at least a part of the base insulating member and the at least a part of the gasket have a same thickness.

4. The secondary battery of claim 1, wherein the inner fastening portion comprises:

a first pressurization portion contacting the base insulating member; and a second pressurization portion contacting the gasket.

5. The secondary battery of claim 1, wherein:

the base insulating member and the gasket are disposed within a same layer of the cap assembly and spaced apart from each other, and the cap assembly defines a space between the base insulating member and the gasket.

6. The secondary battery of claim 1, wherein the gasket comprises:

a first sealing portion disposed between the body part and the cap plate; and a second sealing portion extending from the first sealing portion at least partially disposed along a common plane with the at least a part of the base insulating member.

7. The secondary battery of claim 1, further comprising an electrode terminal spaced from the cap plate, wherein the rivet part comprises:

an outer fastening portion bent from the body part and connected to the electrode terminal; and wherein the inner fastening portion is bent from the body part between the gasket and the electrode assembly and contacts the gasket.

8. The secondary battery of claim 1, wherein the inner fastening portion is disposed between the gasket and the current collection plate.

9. The secondary battery of claim 1, wherein:

the rivet part comprises a rivet protrusion protruding toward the gasket, and the gasket comprises a fastening groove in which the rivet protrusion is received.

10. The secondary battery of claim 1, wherein:

the cap plate comprises a hole protrusion part protruding toward the gasket, and the gasket comprises a groove in which the hole protrusion part is received.

11. A secondary battery comprising:

an electrode assembly comprising an electrode tab;

a case having the electrode assembly received therein;

a cap assembly coupled to the case and covering an opening of the case; and a current collection member coupled to the electrode tab and the cap assembly, wherein the cap assembly comprises:

a cap plate comprising a through hole;

a rivet part comprising a body part positioned in the through hole and extending toward an outside of the case, the body part having a throughbore therein; and a gasket comprising a first sealing portion disposed between the rivet part and the cap plate and a second sealing portion disposed between the current collection member and the cap plate, and the current collection member comprises:

a current collection protrusion positioned in the throughbore; and a current collection plate extending from the current collection protrusion, disposed to overlap the second sealing portion, and pressurizing the second sealing portion toward the cap plate.

12. The secondary battery of claim 11, wherein the rivet part comprises an inner fastening portion contacting the second sealing portion and disposed between the current collection plate and the second sealing portion.

13. The secondary battery of claim 12, wherein the current collection plate comprises:

a first current collection portion overlapping the second sealing portion and the inner fastening portion; and a second current collection portion extending from the first current collection portion and positioned so as to not overlap the second sealing portion.

14. The secondary battery of claim 11, wherein:

the first sealing portion is disposed between the cap plate and the current collection protrusion, and the current collection protrusion pressurizes the first sealing portion toward the cap plate.

15. The secondary battery of claim 11, further comprising a base insulating member disposed between the current collection plate and the cap plate, wherein the current collection plate pressurizes the base insulating member toward the cap plate.

16. The secondary battery of claim 1, wherein the base insulating member and the gasket extend along a common plane.

17. The secondary battery of claim 16, wherein an outer surface of the base insulating member and an outer surface of the gasket extend along the common plane.

18. The secondary battery of claim 16, wherein an inner surface of the base insulating member and an inner surface of the gasket extend along the common plane.

* * * * *